(12) United States Patent
Kishiyama et al.

(10) Patent No.: US 9,094,155 B2
(45) Date of Patent: Jul. 28, 2015

(54) TRANSMISSION APPARATUS, TRANSMISSION METHOD, RECEPTION APPARATUS AND RECEPTION METHOD

(75) Inventors: Yoshihisa Kishiyama, Yokosuka (JP); Kenichi Higuchi, Saitama (JP); Mamoru Sawahashi, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 578 days.

(21) Appl. No.: 13/477,818

(22) Filed: May 22, 2012

(65) Prior Publication Data

US 2012/0230320 A1 Sep. 13, 2012

Related U.S. Application Data

(62) Division of application No. 11/917,718, filed as application No. PCT/JP2006/311878 on Jun. 13, 2006, now abandoned.

(30) Foreign Application Priority Data

| Jun. 14, 2005 | (JP) | 2005-174400 |
| Aug. 23, 2005 | (JP) | 2005-241905 |
| Feb. 8, 2006 | (JP) | 2006-031752 |

(51) Int. Cl.
*H04J 13/00* (2011.01)
*H04L 5/00* (2006.01)

(52) U.S. Cl.
CPC .............. *H04L 5/0023* (2013.01); *H04J 13/00* (2013.01); *H04L 5/005* (2013.01); *H04L 5/0037* (2013.01); *H04L 5/0051* (2013.01); *H04J 13/004* (2013.01)

(58) Field of Classification Search
None
See application file for complete search history.

(56) References Cited

U.S. PATENT DOCUMENTS

| 6,208,699 B1 | 3/2001 | Chen et al. |
| 7,003,021 B2 | 2/2006 | Gilhousen et al. |

(Continued)

FOREIGN PATENT DOCUMENTS

| JP | 2000-201134 | 7/2000 |
| JP | 2001-203665 | 7/2001 |

(Continued)

OTHER PUBLICATIONS

European Search Report for 06757313.9 dated Aug. 8, 2013 (12 pages).

(Continued)

*Primary Examiner* — Mohammad Adhami
(74) *Attorney, Agent, or Firm* — Osha Liang LLP

(57) ABSTRACT

A disclosed transmission apparatus includes a multiplexing portion that multiplexes a common pilot channel, a shared control channel, and a shared data channel; a symbol generation portion that performs an inverse Fourier transformation on the multiplexed signal so as to generate a symbol; and a transmission portion that transmits the generated symbol. The multiplexing portion multiplexes the shared control channel including control information necessary for demodulation of the shared data channel including a payload and the common pilot channel to be used by plural users in a frequency direction, and the shared data channel in a time direction with respect to the common pilot channel and the shared control channel. Even when the number of symbols composing a transmission time interval (TTI) is reduced, transmission efficiency of channels excluding the common pilot channel can be maintained by reducing insertion intervals of the common pilot channel accordingly.

12 Claims, 33 Drawing Sheets

(56) References Cited

U.S. PATENT DOCUMENTS

| | | | |
|---|---|---|---|
| 7,792,532 B1* | 9/2010 | Narayanabhatla et al. | ... 455/447 |
| 2003/0072255 A1 | 4/2003 | Ma et al. | |
| 2003/0099216 A1* | 5/2003 | Nilsson et al. | ............... 370/335 |
| 2004/0028013 A1 | 2/2004 | Fitton et al. | |
| 2004/0165650 A1* | 8/2004 | Miyazaki et al. | ............ 375/141 |
| 2004/0248581 A1* | 12/2004 | Seki et al. | ..................... 455/450 |
| 2005/0008084 A1 | 1/2005 | Zhidkov | |
| 2005/0107036 A1* | 5/2005 | Song et al. | ....................... 455/23 |
| 2005/0169295 A1 | 8/2005 | Yun et al. | |
| 2005/0265293 A1 | 12/2005 | Ro et al. | |
| 2006/0176866 A1* | 8/2006 | Wakabayashi | ............... 370/342 |
| 2006/0221809 A1* | 10/2006 | Malladi et al. | ............... 370/206 |
| 2007/0058595 A1* | 3/2007 | Classon et al. | ............... 370/337 |
| 2008/0039107 A1 | 2/2008 | Ma et al. | |
| 2008/0151743 A1* | 6/2008 | Tong et al. | .................... 370/204 |
| 2009/0310588 A1 | 12/2009 | Padovani et al. | |

FOREIGN PATENT DOCUMENTS

| | | | |
|---|---|---|---|
| JP | 2005-006337 | | 1/2005 |
| JP | 2005-525032 | | 8/2005 |
| JP | 2006-516079 | | 6/2006 |
| JP | 4869724 | | 2/2012 |
| TW | 481953 | | 4/2002 |
| TW | 493352 | | 7/2002 |
| TW | 527801 | | 4/2003 |
| WO | WO03/037027 | * | 5/2003 |
| WO | WO2005/015940 | * | 2/2005 |

OTHER PUBLICATIONS

International Search Report for PCT/JP2006/311878 mailed Sep. 19, 2006, 2 pages.

Written Opinion of International Searching Authority mailed Sep. 19, 2006, 3 pages.

S. Antipolis, "Physical Channels and Multiplexing in Evolved UTRA Downlink" 3GPP TSG RAN WG1 Ad Hoc on LTE, R1-050590, France, Jun. 20-21, 2005, 24 pages.

Y. Kishiyama, et al., "Pilot Channel Using Spector-Specific Orthogonal Sequence for Evolved UTRA OFDM Radio Access in Downlink," 2005 Nen IEICE Communications Society Conference Koen Ronbunshu 1, Sep. 7, 2005, p. 445.

Tachikawa, "W-CDMA Mobile Communication System", published by Maruzen K.K., pp. 100-101, Jun. 25, 2001 (5 pages).

Taiwanese Office Action for Taiwanese Application No. 95120958, mailed on Apr. 17, 2009 (4 pages).

esp@cenet patent abstract for Taiwanese Publication No. 527801, Publication date Apr. 11, 2003 (1 page).

esp@cenet patent abstract for Taiwanese Publication No. 493352, Publication date Jul. 1, 2002 (1 page).

Japanese Office Action for Application No. 2009-191395, mailed on Feb. 10, 2012 (5 pages).

Office Action in corresponding Taiwanese Patent Application No. 098124075 dated Mar. 14, 2013, with translation (12 pages).

3GPP TS 25.892 V6.0.0 (Jun. 2004) 3rd Generation Partnership Project; Technical Specification Group Radio Access Network; Feasibility Study for Orthogonal Frequency Division Multiplexing (OFDM) for UTRAN enhancement (Release 6) (15 pages).

NTT DoCoMo, "Physical Channel Structures for Evolved UTRA", 3GPP TSG RAN WG1 Meeting #41; R1-050464; Athens, Greece, May 9, 2005 through May 13, 2005; (7 pages).

Taiwanese Office Action for Application No. 098124075, mailed on Aug. 9, 2012 (18 pages).

Y Kishiyama, et al., "Experiments on Throughput Performance Above 100-Mbps in Forward Link for VSF-OFCDM Broadband Wireless Access", VTC 2003—Fall pp. 1863-1868 Oct. 2003.

NTT Docomo, Inc., "Downlink Multiple Access Scheme for Evolved UTRA", R1-050249, Apr. 7, 2005.

Y Kishiyama, et al., "Investigation of Optimum Pilot Channel Structure for VSF-OFCDM Broadband Wireless Access in Forward Link", Proc. IEEE VTC 2003, vol. 1, pp. 139-144, 2003.

NTT Docomo, "Evaluation Conditions for Evolved UTRA", 3GPP TSG RAN WG1 Meeting #40bis, R1-050250, Beijing, China, Apr. 4-8, 2005.

3GPP TS 25.213 V6.2.0 (Mar. 2005) 3rd Generation Partnership Project; Technical Specification Group Radio Access Network; Spreading and Modulation (FDD) (Release 6).

Siemens, "A Modified Generator for Multiple-Scrambling Codes", TSG-RAN Working Group 1 meeting #7, TSGR1#7 (99)B87, Hanover, Germany, Aug. 30-Sep. 3, 1999.

Extended European Search Report issued in counterpart European application No. 13195828.2 mailed Jun. 5, 2014 (11 pages).

Office Action issued Feb. 16, 2015 in corresponding Canadian Patent Application No. 2,611,157 (4 pages).

* cited by examiner

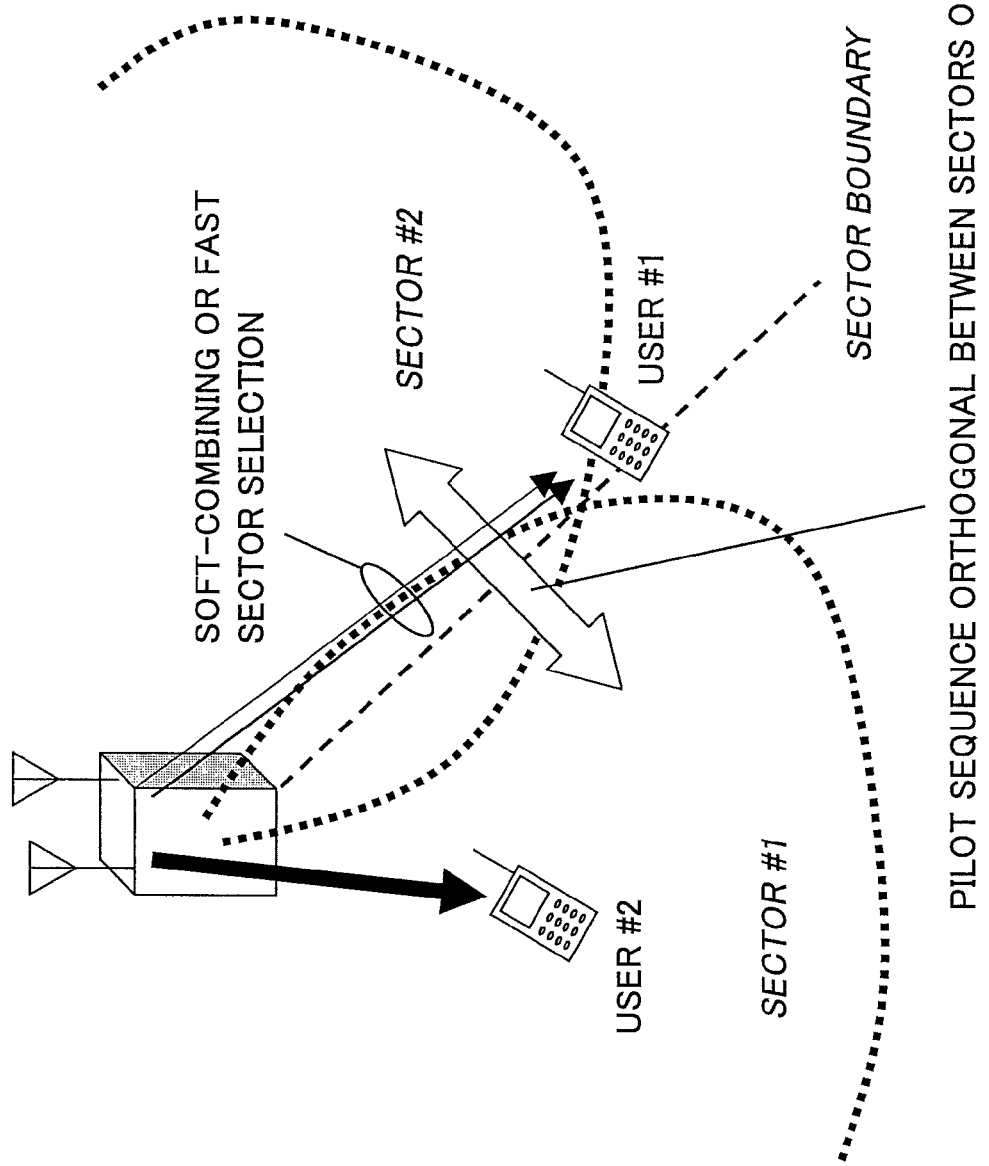

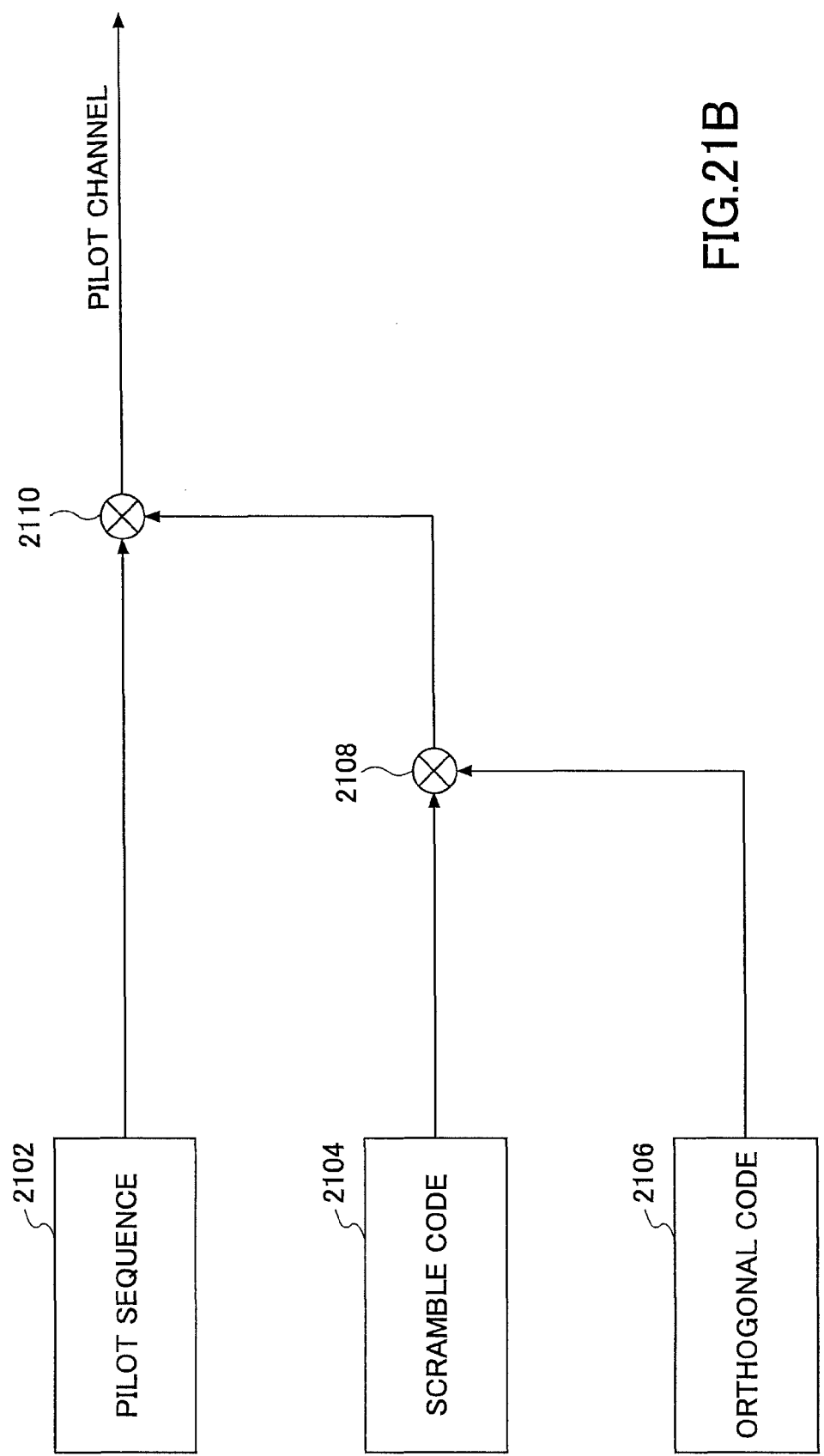

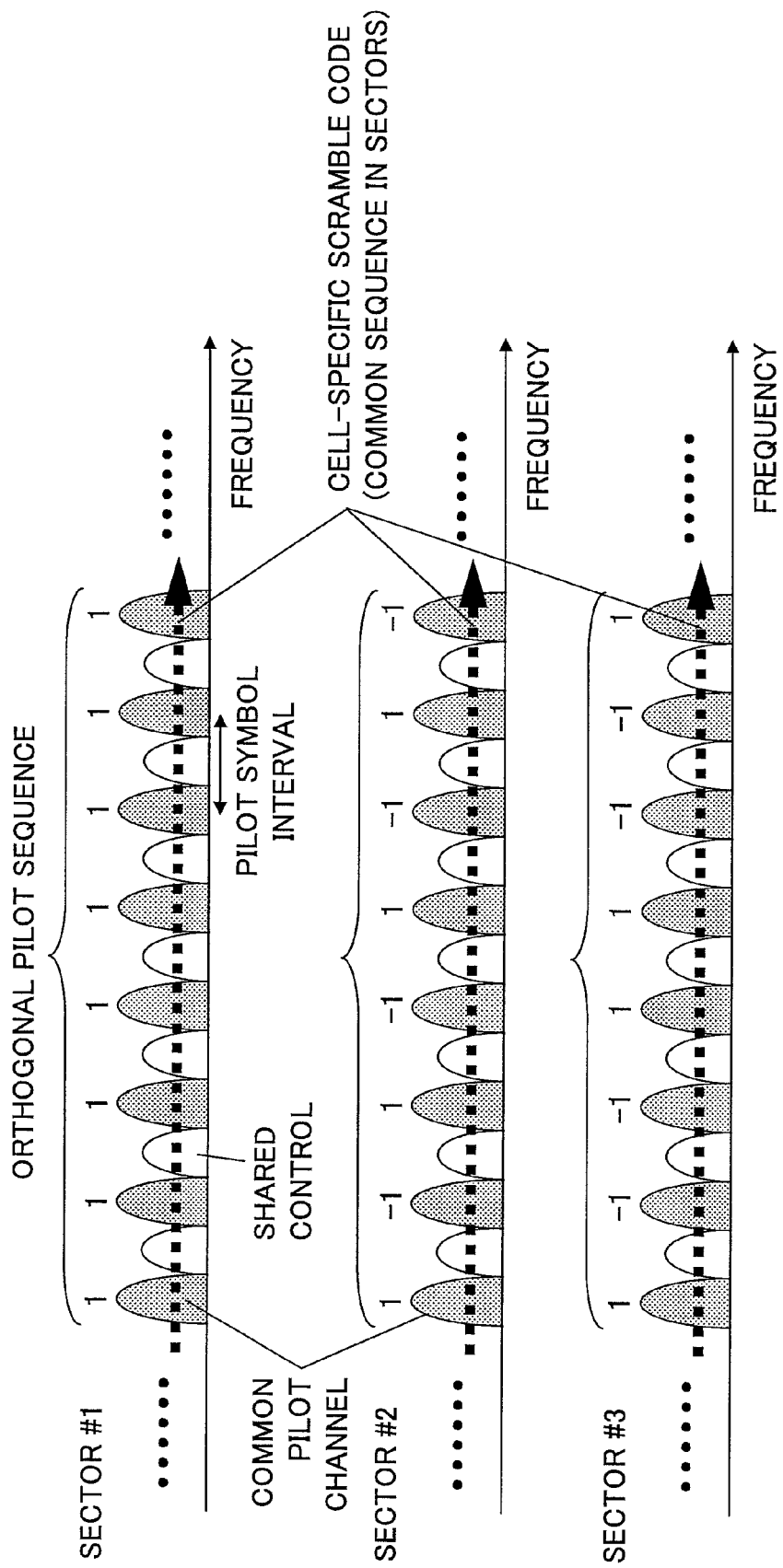

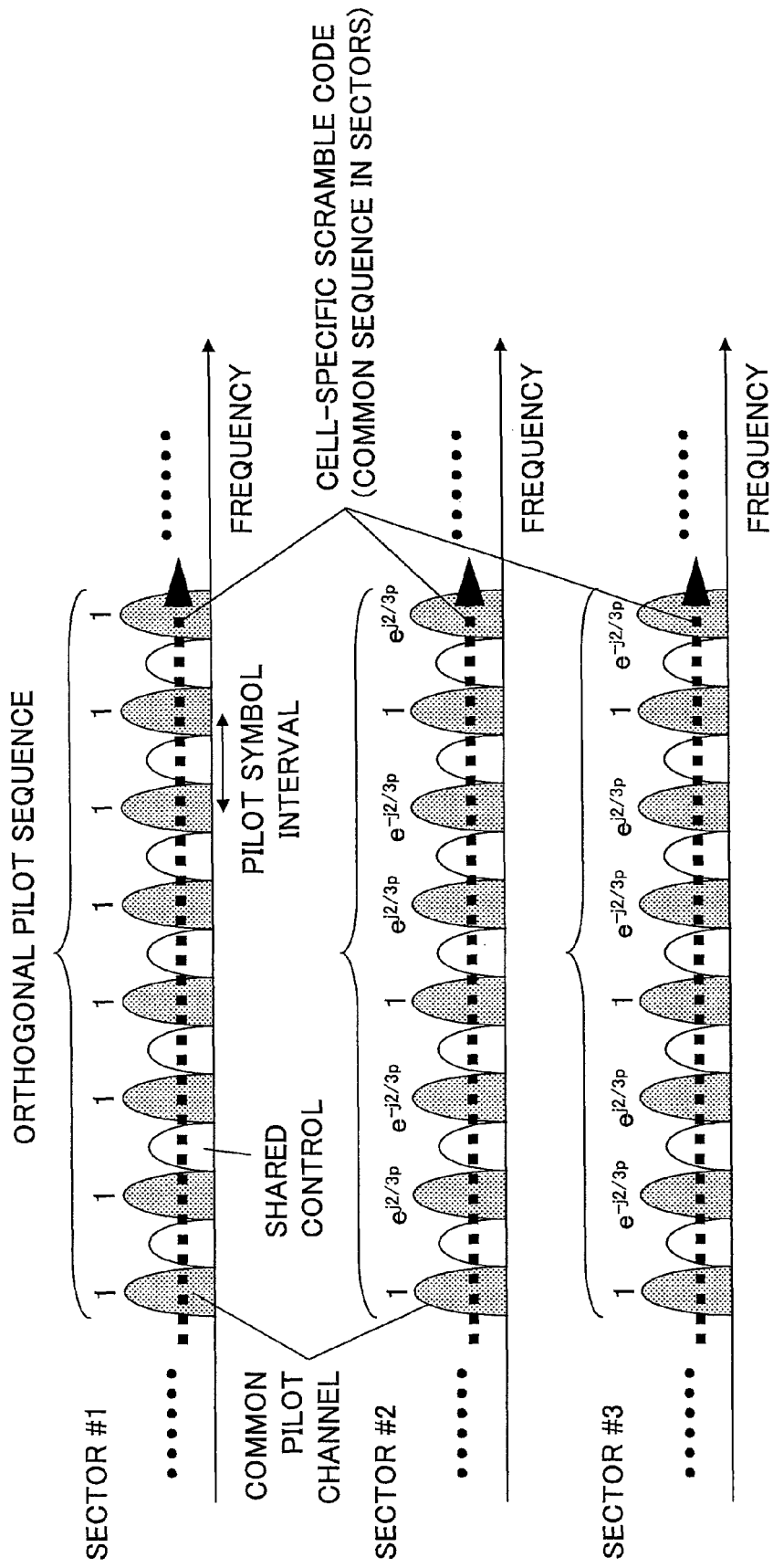

TRANSMISSION APPARATUS, TRANSMISSION METHOD, RECEPTION APPARATUS AND RECEPTION METHOD

TECHNICAL FIELD

The present invention relates generally to a mobile communications field of technology, and specifically to a transmission apparatus, a transmission method, a reception apparatus, and a reception method for use in an Orthogonal Frequency Division Multiplexing (OFDM) method mobile communications system.

BACKGROUND ART

A future mobile communications system that mainly carries out image or data communications requires capabilities far beyond the capability of the conventional mobile communications system (for example, an IMT-2000-based system). To this end, higher capacity, higher speed, broader band or the like have to be realized.

In a broadband mobile communications system, frequency selective fading caused by a multi-path transmission environment tends to be problematic, which makes an OFDM (Orthogonal Frequency Division Multiplexing) method be considered promising as a method of the next generation communications system. In the OFDM method, guard intervals are added to active symbols including information to be transmitted so as to produce symbols, which are in turn transmitted one by one at predetermined transmission time intervals (TTIs). Here, plural TTIs compose one frame. In addition, the guard interval is generated using part of information included in the active symbol. The guard interval may be called a cyclic prefix (CP) in some cases. FIG. 1 shows a relationship among the frame, the TTI, and the symbol. Since a receiver receives signals with various transmission delays, inter-symbol interference is caused. However, in the OFDM method, such inter-symbol interference can be sufficiently suppressed as long as the transmission delays fall within a time length of the guard interval.

During a time period of one TTI, various channels are transmitted. The channels may include a common pilot channel, a shared control channel, and a shared data channel. The common pilot channel is used by plural users to demodulate the shared control channel. Specifically, the common pilot channel is used for channel estimation, synchronous detection, reception signal quality measurement, or the like. The shared control channel is used to demodulate the shared data channel including payload (or traffic information channel). Regarding conventional signal formats including the pilot channel, see non-patent document 1, for example.

[Non-patent document 1] Keiji Tachikawa, "W-CDMA mobile communications method", MARUZEN Co., Ltd., pp. 100-101.

SUMMARY OF INVENTION

Problem to be Solved by the Invention

By the way, the TTI is used to define various units in information transmission. For example, the TTI determines a transmission unit of a packet, an update unit of data-modulating and channel-coding in Modulation and Coding Scheme (MCS), a unit of error correction coding, a retransmission unit of Automatic Repeat reQuest (ARQ), a packet scheduling unit, or the like. Under such circumstances, the TTI length and thus the frame length should be maintained constant. However, the number of symbols included in the TTI may be optionally changed depending on application or system.

The common pilot channel is allocated to one or more symbols in the TTI, and a control channel or a data channel is allocated to other symbols in the same TTI in various conventional transmission methods. When it is assumed that one symbol is occupied by the common pilot channel while the TTI is composed of ten symbols, the common pilot channel occupies 10% of the TTI (1/10). On the other hand, when it is assumed that one symbol is occupied by the common pilot channel while the TTI is composed of five symbols, the common pilot occupies as much as 20% of the TTI (1/5). Therefore, reduction of the number of the symbols included in the TTI leads to a problem of reduced transmission efficiency of the data channel. Such a problem becomes significant especially when the number of the symbols in the TTI is reduced.

The present invention has been made to address the above problem, and is directed to a transmission apparatus, a transmission method, a reception apparatus, and a reception method in which the data channel transmission efficiency can be maintained or improved even when the number of the symbols included in the TTI is reduced.

Means for Solving the Problem

An embodiment according to the present invention provides a transmission apparatus that includes a multiplexing portion that multiplexes a common pilot channel, a shared control channel, and a shared data channel; a symbol generation portion that performs an inverse Fourier transformation on the multiplexed signal so as to generate a symbol; and a transmission portion that transmits the generated symbol. In this embodiment, the multiplexing portion multiplexes in a frequency direction the shared control channel including control information necessary for demodulation of the shared data channel including a payload and the common pilot channel to be used by plural users, and also multiplexes the shared data channel in a time direction with respect to both the common pilot channel and the shared control channel. Even when the number of symbols composing the transmission time interval (TTI) is reduced, transmission efficiency of channels excluding the common pilot channel can be maintained by reducing insertion intervals of the common pilot channel accordingly.

Advantage of the Invention

According to the present invention, the data channel transmission efficiency can be maintained or improved even when the number of the symbols included in the TTI is reduced.

BRIEF DESCRIPTION OF THE DRAWINGS

FIG. 21A schematically shows mobile communications using pilot sequences orthogonal with each other between sectors;

FIG. 21B shows a pilot channel generation portion for use in a transmitter according to an example of the present invention;

FIG. 22 shows a specific example of orthogonal pilot sequences;

FIG. 23 shows a specific example of orthogonal pilot sequences;

Figure 1:
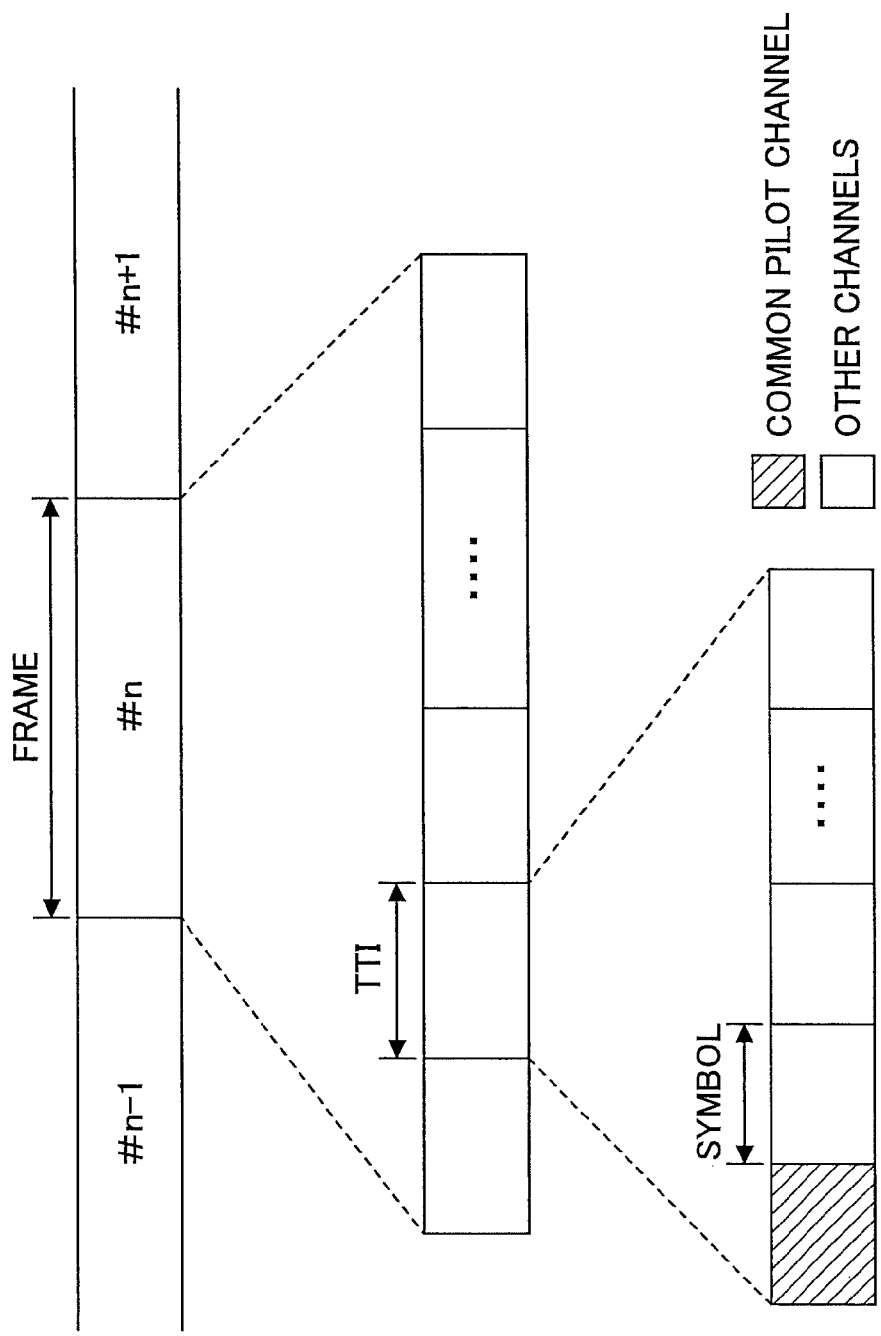
FIG. 1 shows a relationship among a frame, a transmission time interval (TTI), and a symbol.

LIST OF REFERENCE SYMBOLS 202-1 through 202-K: data channel processing portion
210: spreading and channel coding portion
212: interleaving portion
214: data demodulation portion
216: time/frequency mapping portion
204: common pilot multiplexing portion
206: Inverse Fast Fourier Transformation (IFFT) portion
208: guard interval insertion portion
302: guard interval removal portion
304: Fast Fourier Transformation portion
308: channel estimation portion
310: dedicated pilot separation portion
312: time/frequency data extraction portion
314: data demodulation portion
316: deinterleaving portion
318: despreading and channel decoding portion
72: dedicated pilot channel control portion
74: dedicated pilot multiplexing portion
102: dedicated pilot multiplexing portion
104: antenna weight control portion
106: weight setting portibn
2102: pilot sequence providing portion
2104: scramble code portion
2106: orthogonal code portion
2108, 2110: multiplication portion
2502, 2504: providing portion
2506: scramble code portion
2508: orthogonal code portion
2510, 2512, 2514: multiplication portion
2602: scramble code portion
2604: multiplication portion

BEST MODE FOR CARRYING OUT THE INVENTION

According to one aspect of the present invention, a common pilot channel and a shared data channel are time-multiplexed, and a common control channel and a data channel are also time-multiplexed. Since the common pilot channel is allocated not to an entire frequency band but to part of the frequency band or part of sub-carriers, other channels excluding the common pilot channel are allocated to other sub-carriers in the symbol. By adjusting an insertion position of the common pilot channel in a frequency direction, the ratio of the common pilot channel in relation to the symbol can also be adjusted. Therefore, even when the number of symbols composing the TTI is reduced (and a time period of one symbol becomes longer), transmission efficiencies of other channels excluding the common pilot channel can be maintained by reducing the number (frequency) of the inserted common pilot channels accordingly.

According to another aspect of the present invention, a dedicated pilot channel to be used by one or more specific users to demodulate the shared data channel and a combination of the common pilot channel and the shared control channel are multiplexed in a time direction. By estimating channels using the dedicated pilot channel in addition to the common pilot channel, channel estimation accuracy or the like will be improved.

The dedicated pilot channel is time-multiplexed at a first point of time at constant frequency intervals and also time-multiplexed at a second time at the constant frequency intervals. By dispersing the pilot channels in the time and the frequency direction, a diversity effect of the pilot channel can be improved while transmission efficiency of channels excluding the pilot channel is improved.

The dedicated pilot channel is transmitted to a communications party that moves at a higher moving velocity but not necessarily transmitted to a communications party that does not move at a higher moving velocity. By transmitting the dedicated pilot channel to only a user whose channel fluctuation is considered to be large in the time direction, unnecessary transmission of the dedicated transmission channel can be avoided.

A beam directionality adjuster that adjusts directionality of the transmission beam toward a specific communications party may be provided in a transmission apparatus. The dedicated pilot channel may be inserted for a specific communications party. When the directional beam is used, channel qualities are different from beam to beam. By utilizing the dedicated pilot channel directed toward the specific communications party in addition to the common pilot channel, channel estimation accuracy is improved.

When the MIMO multiplexing method is used, the pilot channel may be transmitted from one or more transmission antennas and the dedicated pilot channel may be transmitted from another one or more transmission antennas, which allows for appropriate MIMO multiplexing transmission depending on the class of a reception apparatus (specifically, the number of reception antennas).

According to another aspect of the present invention, there is provided a reception apparatus having a reception portion that receives a symbol transmitted from a transmitter, a transformation portion that performs the Fourier transformation on the received symbol, and a separation portion that separates a common pilot channel, a shared control channel, and a shared data channel from the transformed signal. The separation portion frequency-separates the common pilot channel used by plural users to demodulate the shared control channel and the shared control channel used to demodulate the shared data channel, and time-separates the shared data channel including a payload and a combination of the common pilot channel and the shared control channel.

In a transmission apparatus according to another aspect of the present invention, the common pilot channel is multiplied by a spreading code sequence (scramble code) common to plural sectors and an orthogonal code sequence which is different from sector to sector, and the resultant signal is transmitted to a communications party (typically, a mobile station). Since one sector is distinguished from the other sectors by not the scramble code but the orthogonal code, distinguishing sectors is easily and highly accurately carried out, thereby improving quality of the pilot channel.

Other channels excluding the common pilot channel may be multiplied by the spreading code sequence (scramble code) common to plural sectors and the orthogonal code sequence which is different from sector to sector.

From a spreading code sequence common to plural sectors, another spreading code is derived in accordance with a predetermined rule, and the derived spreading code may multiply other channels excluding the pilot channel. With this, while different scramble codes are used for the pilot channel and other channels, those scramble codes can be readily detected by using the deriving rule.

The pilot channel and the shared control channel may be multiplied by the spreading code sequence (scramble code) common to plural sectors and the orthogonal code sequence which is different from sector to sector, and the shared data channel may be multiplied by another spreading code. With this, scramble codes can be used accordingly from the viewpoint of, for example, a change in a spreading factor.

In the following examples, although the present invention is described in the context of a system employing the OFDM method in downlink, other systems employing, for example, a multi-carrier method may be used.

Example 1

Figure 2:
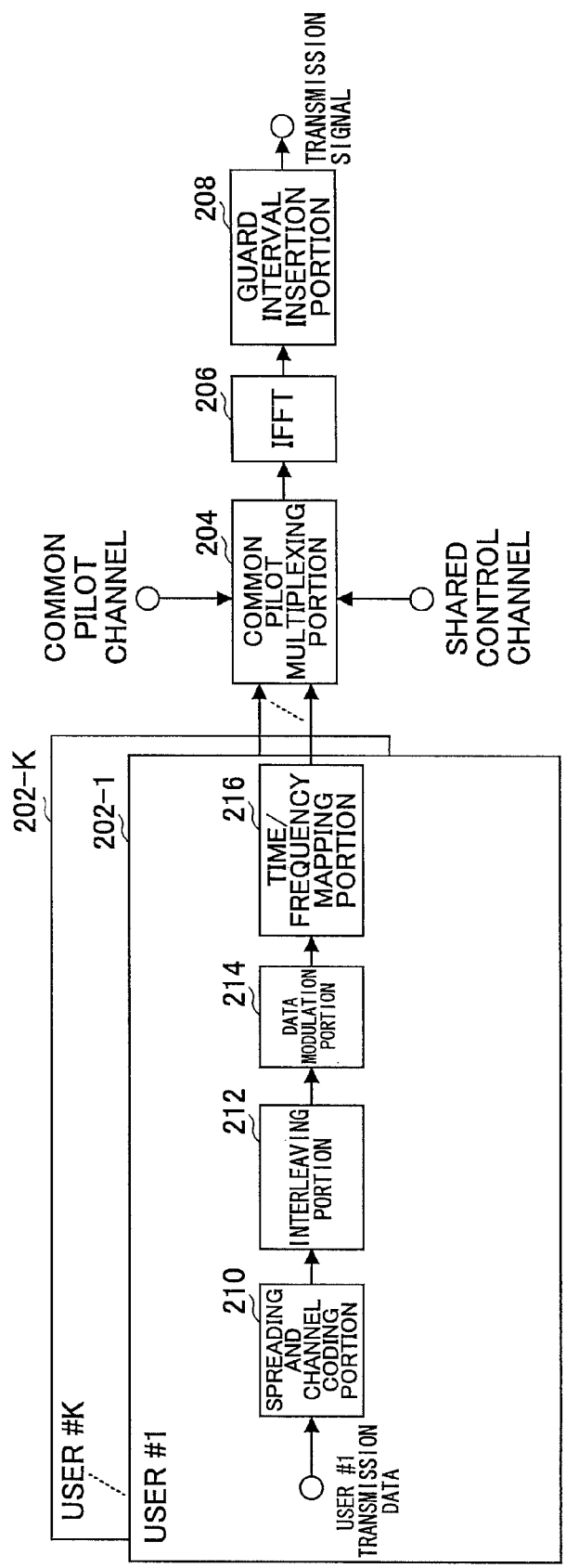
FIG. 2 is a block diagram of a transmitter according to an example of the present invention.

FIG. 2 shows a part of a transmitter according to a first example of the present invention. Although this transmitter is typically provided in a radio base station of a mobile communications system as described in this example, the transmitter may be provided in other apparatuses. The transmitter has plural data channel processing portions 202-1 to 101-K, the number of which is K, a common pilot multiplexing portion 204, an IFFT portion 206, and a guard interval insertion portion 208. Since the K data channel processing portions 202-1 to 202-K have identical functions and configurations, a first data channel processing portion 202-1 represents the others in the following explanation. The data channel processing portion 202-1 has a spreading and channel coding portion 210, an interleaving portion 212, a data modulation portion 214, and a time and frequency mapping portion 216.

The data channel processing portion 202-1 processes a data channel for a first user. While one data channel processing portion carries out a process for one user for simplicity of explanation, plural data channel processing portions may be used for one user.

The spreading and channel coding portion 210 performs channel coding on the data channel to be transmitted, thereby enhancing error correction capability. It should be noted that code spreading is not performed in this particular example because the OFDM method is employed. However, when an OFCDM (Orthogonal Frequency and Code Division Multiplexing) method is employed in other examples, the spreading and channel coding portion 210 conducts both the channel coding and the code spreading on the data channel to be transmitted. The channel coding may be turbo coding.

The interleaving portion 212 changes the order of symbols of the channel-coded signal in a time direction and/or a frequency direction in accordance with a predetermined rule known by the transmitter and its corresponding receiver.

The data modulation portion 214 maps the signal to be transmitted in a signal constellation in accordance with an appropriate modulation method. As the modulation method, various modulation methods such as QPSK, 16QAM, 64QAM or the like may be employed. When Adaptive Modulation and Coding Scheme (AMCS) is employed, the modulation method and a channel coding rate are assigned on a case-by-case basis.

The time and frequency mapping portion 216 determines how the data channels to be transmitted are mapped in the time and/or the frequency direction.

The common pilot multiplexing portion 204 multiplexes the common pilot channels, the shared control channels, and the data channels, and outputs the multiplexed channels. The multiplexing may be made in the time direction, in the frequency direction, or in both the time and the frequency directions.

The IFFT portion 206 performs the Inverse Fast Fourier Transformation on the signal to be transmitted, or the modulation according to the OFDM method, which forms an active symbol portion.

The guard interval insertion portion 208 extracts a part of the active symbol and adds the extracted part to a top or end of the active symbol, thereby forming a transmission symbol (transmission signal).

The data channel processing portions 202-1 through 202-K process the data channels to be transmitted to the corresponding users. In the data channel processing portions 202-1 to 202-K, the data channels are channel-coded, interleaved, data-modulated, and mapped in the time/frequency directions. The mapped data channels are output from the corresponding data channel processing portions 202-1 to 202-K and input to the common pilot multiplexing portion 204, in which the data channels are multiplexed with the common pilot channels and the shared control channels. The multiplexed signal undergoes the Inverse Fast Fourier Transformation, and a guard interval is added to the transformed signal (the active symbol portion), thereby forming the transmission symbol. The transmission symbol is transmitted via a radio portion (not shown).

Figure 3:
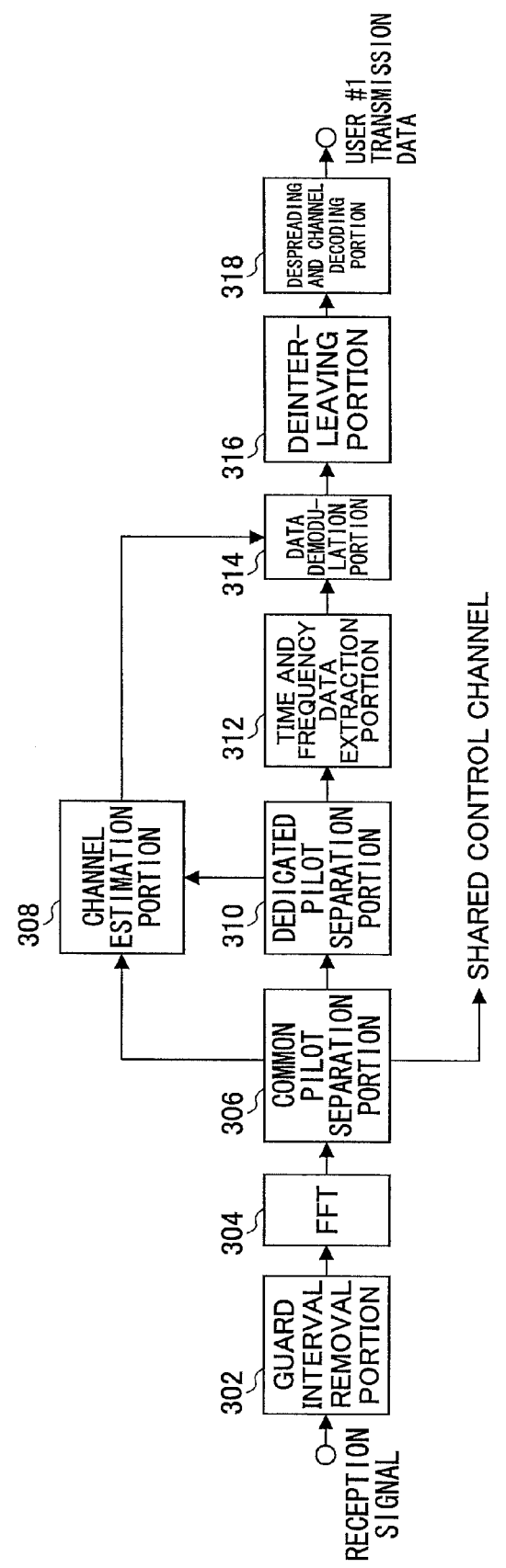
FIG. 3 is a block diagram of a receiver according to an example of the present invention.

FIG. 3 shows a part of a receiver according to this example of the present invention. While this receiver is provided in a mobile station (for example, user equipment of a user #1) of the mobile communications system as shown in this example, the receiver may be provided in other apparatuses. The receiver has a guard interval removal portion 302, an FFT portion 304, a common pilot separation portion 306, a channel estimation portion 308, a dedicated pilot separation portion 310, a time and frequency data extraction portion 312, a data demodulation portion 314, a deinterleaving portion 316, and a despreading and channel decoding portion 318.

The guard interval removal portion 302 removes the guard interval from the transmitted symbol and thus extracts the active symbol portion.

The FFT portion 304 performs the Fast Fourier Transformation on the signal, or demodulation according to the OFDM method.

The common pilot separation portion 306 separates every sub-carrier demodulated in accordance with the OFDM method so as to obtain the common pilot channels, the shared control channels, and other channels.

The channel estimation portion 308 performs channel estimation using the separated common pilot channels and outputs to the data demodulation portion 314 or the like a control signal for channel compensation. Such control signal is also used for the channel compensation for the shared control channels, though not shown for simplicity of illustration.

The dedicated pilot separation portion 310 is not used in this example but used to separate the dedicated pilot channels from the other channels in a below-described example. The dedicated pilot channels are given to the channel estimation portion 308 and used in order to enhance the channel estimation accuracy.

The time and frequency data extraction portion 312 extracts the data channels in accordance with the mapping rule determined by the transmitter and outputs the extracted data channels.

The data demodulation portion 314 performs channel compensation and then demodulation on the data channels. The modulation method is in accordance with the modulation method performed in the transmitter.

The deinterleaving portion 316 changes the order of the symbol of the data channels in accordance with the interleaving performed in the transmitter.

The despreading and channel coding portion 318 performs channel decoding on the received data channels. Since the OFDM method is employed, code despreading is not performed in this example. However, when the OFCDM method is employed in other examples, the despreading and channel decoding portion 318 conducts both the code despreading and the channel decoding on the received data channels.

A signal received by an antenna (not shown) passes through a radio portion (not shown), is converted into a base band signal, and undergoes the guard interval removal and the Inverse Fast Fourier Transformation. From the transformed signal is separated the common pilot channels, which are used in the channel estimation. Additionally, the shared control channels and the data channels are separated from the transformed signal and then demodulated. The demodulated data channels are deinterleaved and channel-decoded, and thus the data that have been transmitted from the transmitter are restored.

Figure 4:
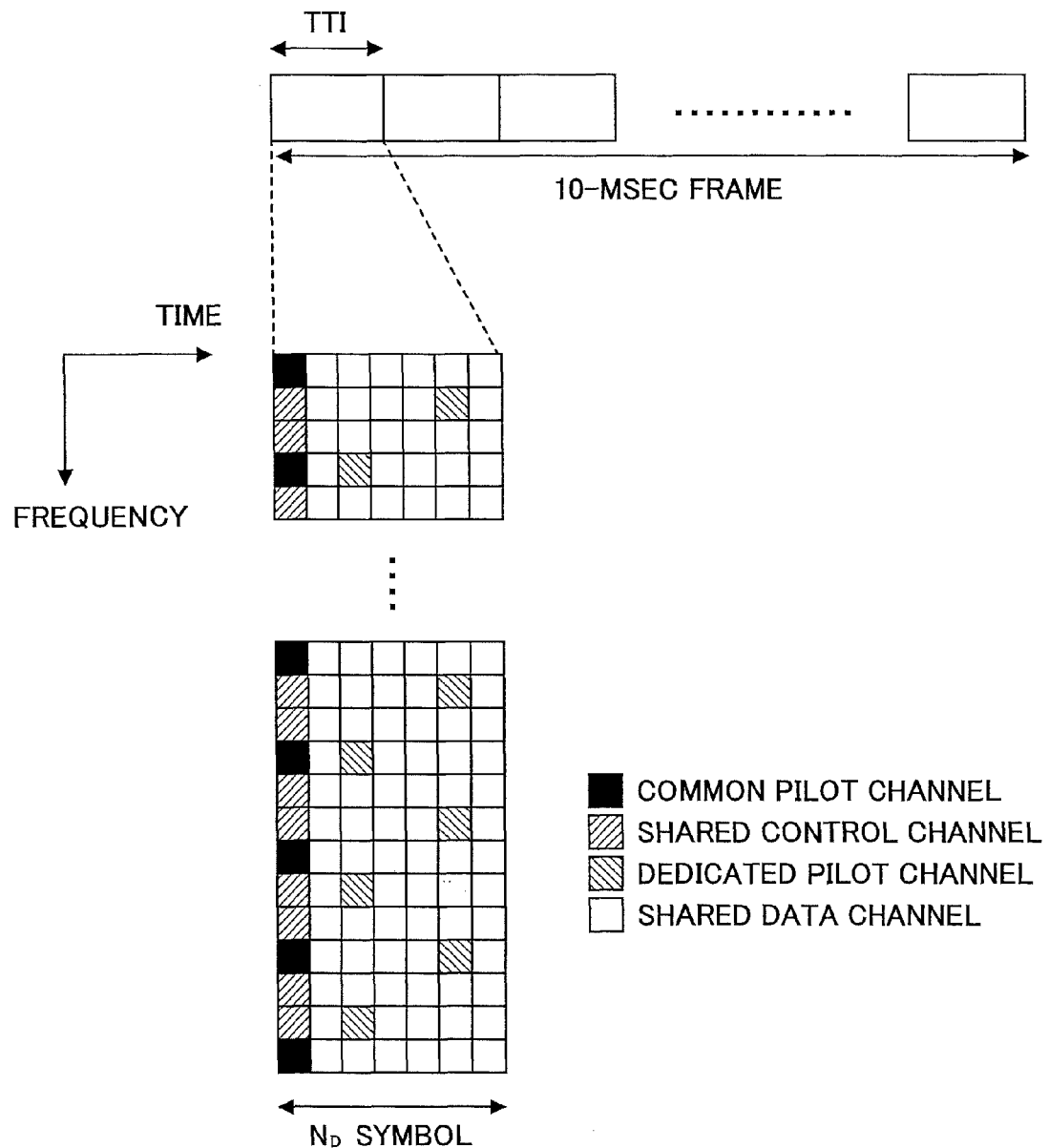
FIG. 4 shows an example of a channel configuration according to an example of the present invention.

FIG. 4 shows how various channels are multiplexed in this example. As an example, 20 TTIs are included in a 10 ms frame, which means one TTI is 0.5 ms. One TTI is composed of 7 symbols arranged along the time direction ($N_D=7$).

In the illustrated example, the common pilot channels, the shared control channels, the dedicated pilot channels, and the data channels are multiplexed. The dedicated pilot channels are described in a second example and beyond. The common pilot channels and the shared control channels are frequency-multiplexed in one symbol. Specifically, the common pilot channels are inserted at certain frequency intervals into a leading symbol of the TTI. On the other hand, the shared data channels are transmitted by a second symbol and beyond in the same TTI. Namely, the common pilot channels and the shared data channels are time-multiplexed, and the shared control channels and the data channels are also time-multiplexed. Since the common pilot channels are allocated not to the entire frequency band in the TTI but to a part of the frequency band or a part of the sub-carriers, other channels excluding the common pilot channels can be allocated to the other sub-carriers. By adjusting insertion intervals of the common pilot channels in the frequency direction, the ratio of the common pilot channels in relation to the TTI can be adjusted. For example, when the number of the symbols in the TTI is reduced (and a time period per symbol becomes longer accordingly), channel transmission efficiency of the channels excluding the common pilot channels can be maintained by accordingly reducing insertion frequencies of the common pilot channels.

Figure 5:
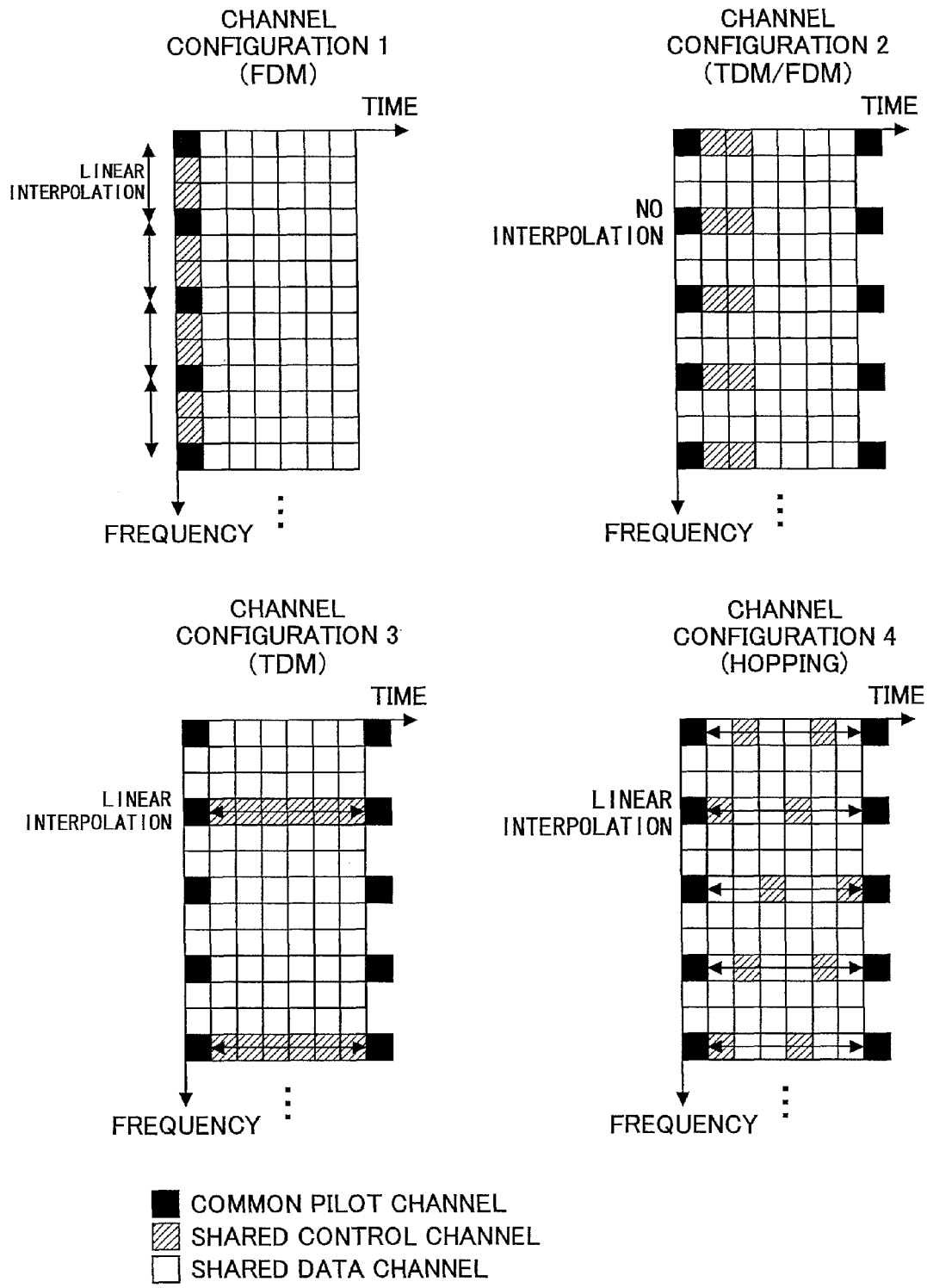
FIG. 5 shows various channel configurations.

FIG. 5 shows various examples of channel configurations in which the common pilot channels and the shared control channels are multiplexed. It should be noted that the channel configurations are not limited to the illustrated examples but are realized into yet another configuration. A channel configuration 1 shown in FIG. 5 is the same as the channel configuration shown in FIG. 4. As stated, the common pilot channels are used for the channel estimation to demodulate the shared control channels. In the channel configuration 1, since the common pilot channels and the shared control channels are frequency-multiplexed, there are no common pilot channels for the sub-carrier that contains the shared control channels and therefore a channel estimation value cannot be directly obtained for the shared control channels in the channel configuration 1. Therefore, the channel estimation value for the shared control channel has to be obtained by interpolating the channel estimation values for the sub-carriers that contain the common pilot channels. The interpolation may be a linear interpolation. By the way, bi-directional arrows in FIG. 5 indicate that the interpolation is carried out in the marked section. In this particular example, since all the common pilot channels and the shared control channels are allocated to the leading symbol, demodulation of the shared data channels can be carried out quickly. In addition, since the common pilot channels and the shared control channels are distributed widely in the frequency direction, a frequency diversity effect can be improved and resilience to frequency selective fading can be enhanced.

In a channel configuration 2, the common pilot channels and the shared control channels are time-multiplexed. In this configuration, no interpolation is necessary in contrast to the channel configuration 1. In addition, the common pilot channels and the shared control channels are distributed widely in the frequency direction, thereby enhancing resilience to the frequency selective fading.

In a channel configuration 3, the shared control channels are inserted after a part of the common pilot channels but not after the other common pilot channels. The common pilot channels and the shared control channels multiplexed in the time direction allow for power ratio adjustment during transmission. In this configuration, since the shared control channels are inserted so as to substantially cover the TTI in the time direction, the channel estimation throughout the entire TTI is necessary. In this case, if only the common pilot channels in the leading symbol are used for the channel estimation, the channel estimation accuracy for the end symbol is not sufficiently assured. The situation becomes worse especially when the receiver is moving at a higher moving velocity since channel fluctuation in the time direction tends to be rather large in this case. Therefore, the channel estimation value obtained from the leading symbol in the TTI and the channel estimation value obtained from the end symbol in the TTI are used (for example, linearly interpolated) so as to preferably perform the channel estimation.

In a channel configuration 4, the shared control channels are multiplexed by frequency hopping in the time and the frequency directions. Since the common pilot channels and the shared control channels are distributed widely in the frequency direction, the resilience to the frequency selective fading can be enhanced. In addition, since the common pilot channels and the shared control channels are distributed also in the time direction, the power ratio can be adjusted during transmission.

Example 2

In a second example of the present invention, the dedicated pilot channels are used in addition to the common pilot channels. These channels are the same in that these channels are used for the channel estimation or the like. However, these channels are different in that the dedicated pilot channels are used only for a particular mobile station while the common pilot channels are used for all the mobile stations. Therefore, while only one kind of signal may be prepared as a signal indicating the common channel, plural kinds of signals have to be prepared as signals indicating the dedicated pilot channels, the number of which is larger than the number of the mobile phones. The dedicated pilot channels are used when the mobile phones move at higher moving velocity, when a directional beam is used in downlink, and when the mobile stations have the predetermined number of reception antennas, or the like, the details of which are explained below.

Figure 6:
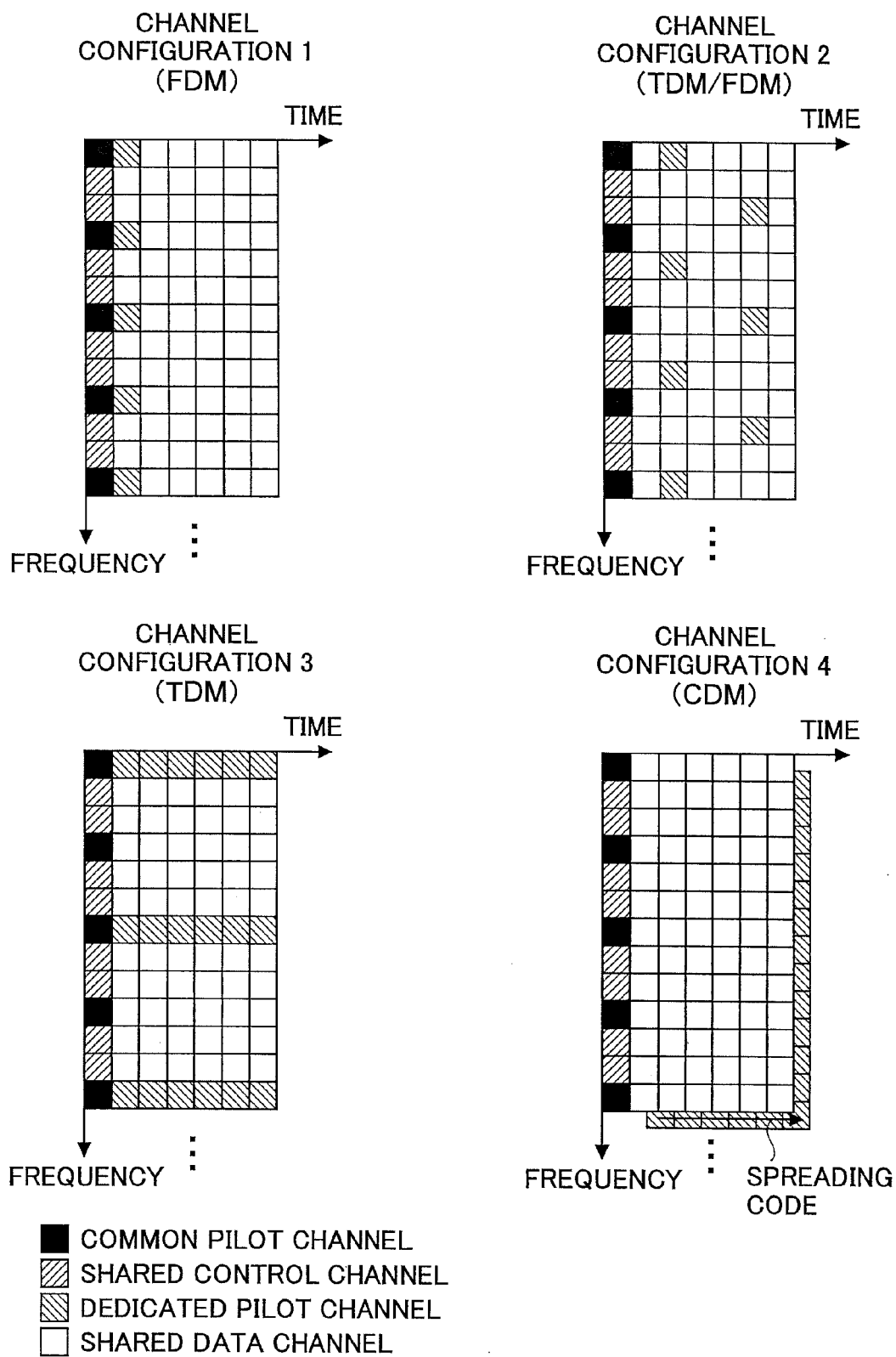
FIG. 6 shows various channel configurations including dedicated pilot channels.

FIG. 6 shows various channel configurations including the dedicated pilot channels. The channel configurations are not limited to the illustrated configurations but may be realized in any other configuration. In a channel configuration 1 of FIG. 6, the dedicated pilot channels are inserted in a second symbol at predetermined intervals. In a channel configuration 2 of FIG. 6, the dedicated pilot channels are inserted in a frequency hopping pattern both in the time and the frequency directions. In a channel configuration 3 of FIG. 3, the dedicated pilot channels are time-multiplexed after a part of the common pilot channels but not after the other common pilot channels. In a channel configuration 4 of FIG. 6, the dedicated pilot channels and the shared data channels are code-multiplexed.

Figure 7:
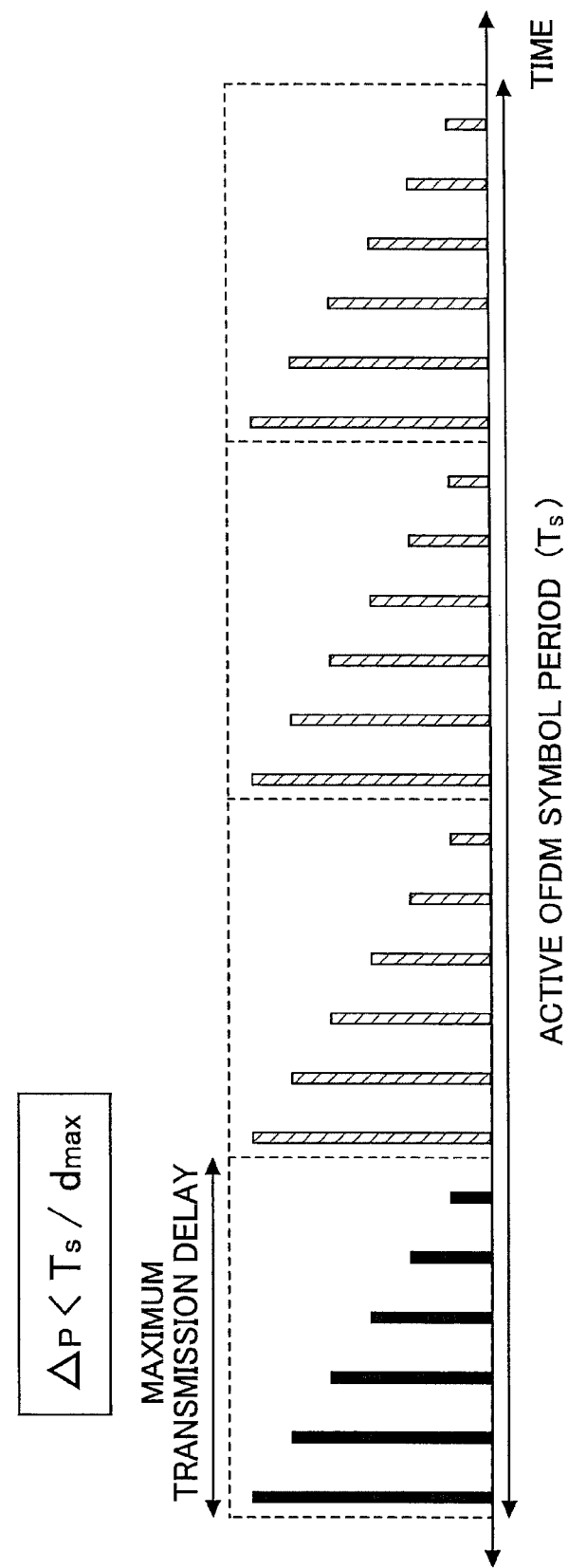
FIG. 7 shows a relationship among an insertion interval, a symbol length, and a maximum delay time.

Regarding the common pilot channels and the dedicated pilot channels, when the channel estimation is carried out in the time domain, insertion intervals $\Delta_p$ of the pilot channels are required to satisfy the sampling theorem. Specifically, the insertion intervals $\Delta_p$ are set so as to satisfy the following relationship:

$$\Delta p < T_s / d_{max}$$

where $T_s$ represents a time period of the active symbol portion (a symbol time period obtained after the guard interval removal) and $d_{max}$ represents the maximum value of path propagation delay, the relationship of which is illustrated in FIG. 7. For example, when $T_s$ and $d_{max}$ are equal to 80 μs and 20 μs, respectively, the insertion intervals have to be 4 or below.

Example 3

Figure 8:
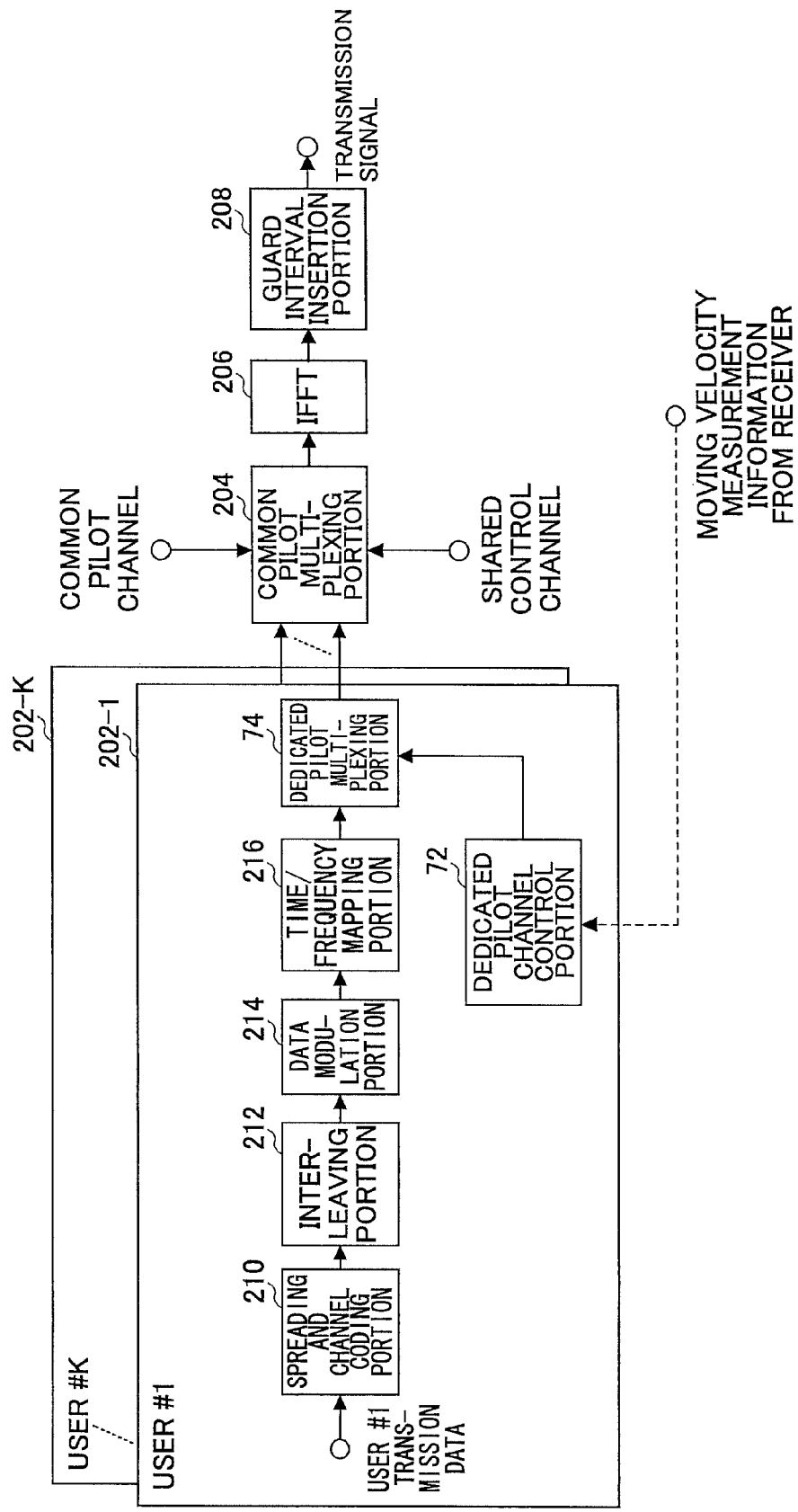
FIG. 8 is a diagram of a transmitter according to an example of the present invention.

FIG. 8 shows a part of transmitter according to a third example of the present invention. In FIG. 8, like numerals are given to the elements that have been already explained in reference to FIG. 2. As shown, the data channel processing portion 202-1 additionally has a dedicated pilot channel control portion 72 and a dedicated pilot channel multiplexing portion 74. These elements are provided in the other data channel processing portions 202-2 to 202-K. The dedicated pilot channel control portion 72 determines, in accordance with mobility of a mobile station concerned, whether the dedicated pilot channels are inserted into a signal to be transmitted to the mobile station. The mobility may be measured, for example, through the maximum Doppler frequency. When the measured mobility exceeds a predetermined level, the dedicated pilot channels may be inserted. The dedicated pilot multiplexing portion 74 inserts or does not insert the dedicated pilot channels to the signal to be transmitted to the user in accordance with instruction from the dedicated pilot channel control portion 72, and outputs the signal with or without the dedicated pilot channels to the common pilot multiplexing portion 204.

For example, the mobile station shown in FIG. 3 notifies the radio base station of any indication that can be used by the radio base station to determine whether the mobile station is moving at a higher speed. Such indication may be, but not limited to, the maximum Doppler frequency. When it is determined by the dedicated pilot channel control portion 72 that the mobile station is moving at a higher moving velocity, the dedicated pilot channels are multiplexed with the signal in the dedicated pilot multiplexing portion 74. When it is determined to the contrary, the dedicated pilot channels are not multiplexed. In this example, the dedicated pilot channels are inserted to the signal to be transmitted to the fast-moving mobile station, whereas the dedicated pilot channels are not inserted to the signal to be transmitted to the slowly moving or stationary mobile station. The dedicated pilot channels in addition to the common pilot channels are used in the fast-moving mobile station, thereby enhancing the channel estimation accuracy.

Figure 9:
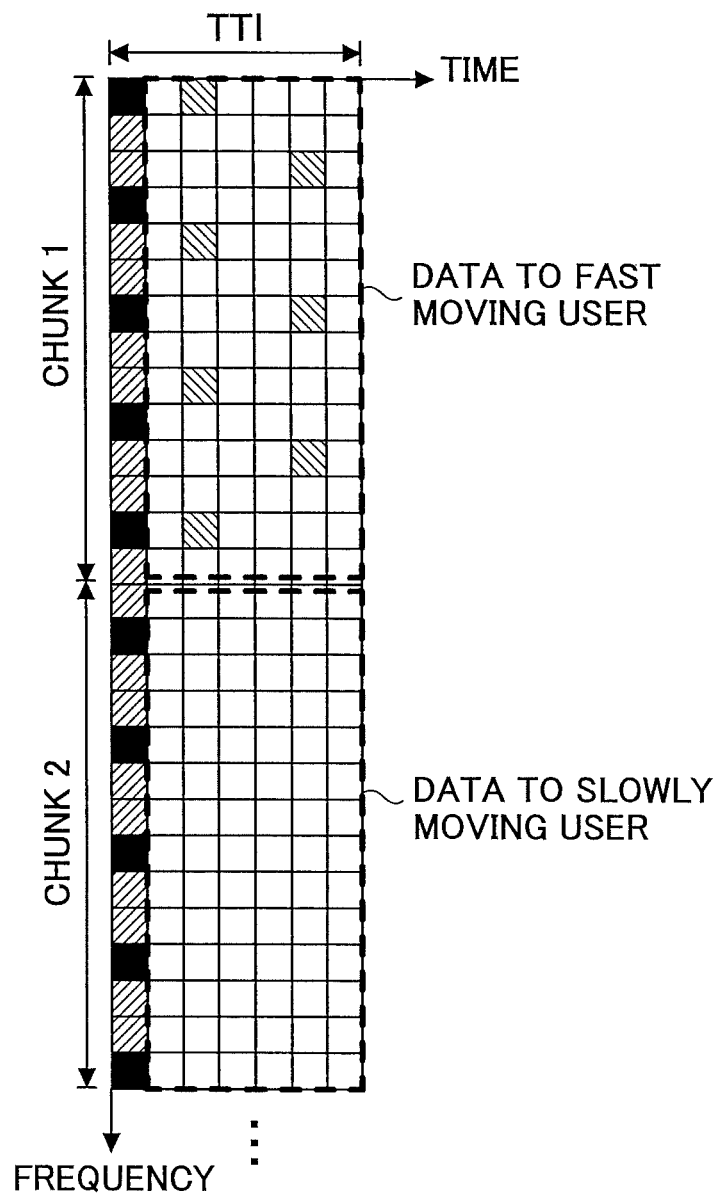
FIG. 9 shows an example of a channel configuration according to the present invention.

FIG. 9 shows an example of a channel configuration when the frequency band is divided into plural frequency blocks. One frequency block includes plural sub-carriers. Such a frequency block may be called a chunk, a frequency chunk, or a resource block. A user can use one chunk or more in accordance with transmission contents (data size or the like). In the illustrated example, a frequency chunk 1 is used by a fast-moving user and the shared data channels and the dedicated pilot channels are multiplexed in the chunk 1. In addition, another frequency chunk 2 is used by a user who is not moving fast, and the dedicated pilot channels are not multiplexed in the chunk 2. In the case of the fast-moving mobile station, since the channel estimation value may change largely from time to time, both the common pilot channels and the dedicated pilot channels are used, thereby obtaining the highly accurate channel estimation value. On the other hand, in the case of the stationary or slowly moving mobile station, the channel estimation value is not expected to change largely from time to time. Transmitting the common pilot channels and the dedicated pilot channels to such a user may result in impaired data transmission efficiency since the unnecessary pilot channels are transmitted. However, the dedicated pilot channel estimation portion 72 detects the mobility of the mobile station and determines whether the dedicated pilot channels are required in accordance with the detected mobility in this example, thereby preventing wasteful transmission of the dedicated pilot channels.

Example 4

Figure 10:
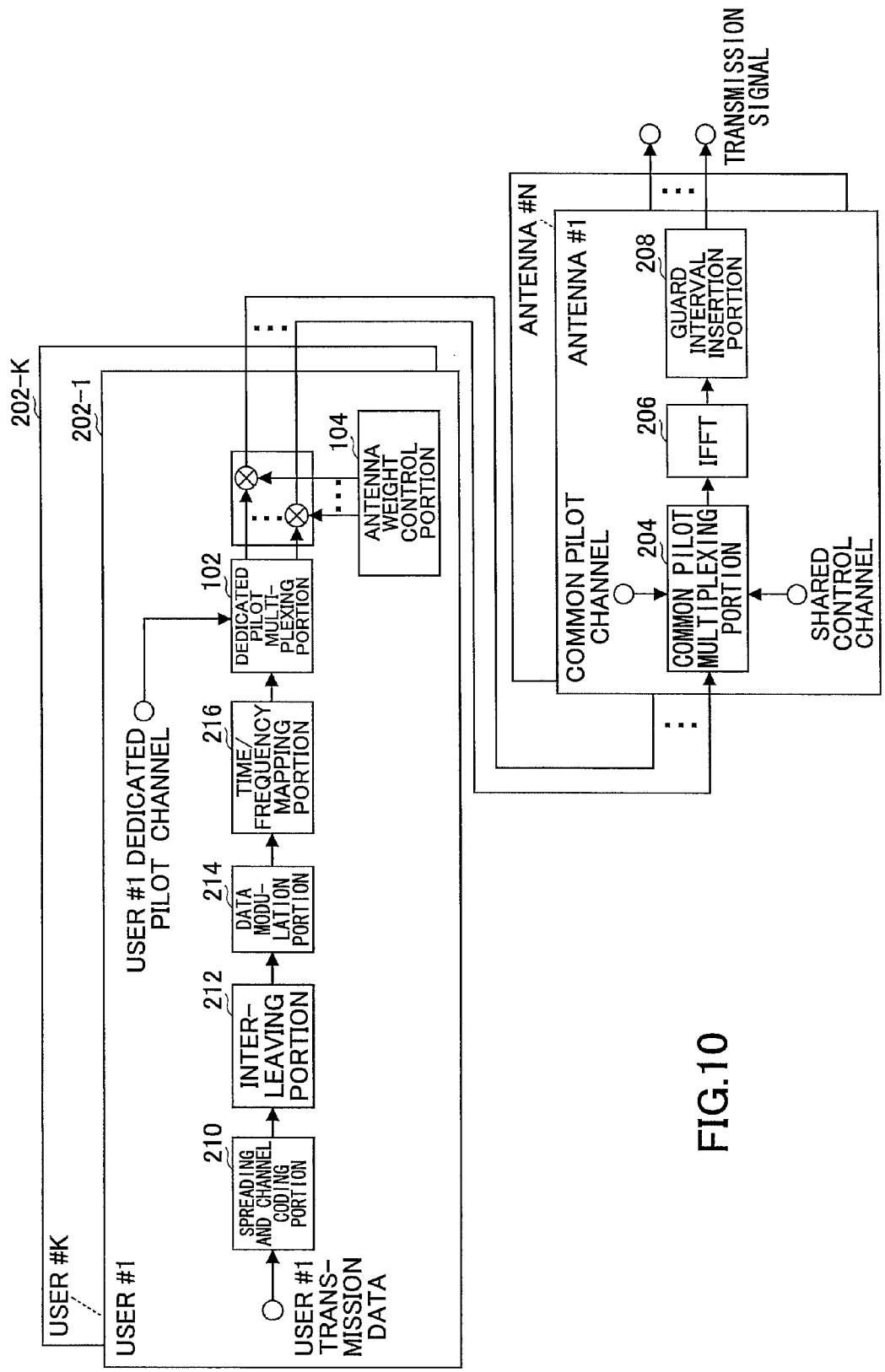
FIG. 10 is a block diagram of a transmitter according to an example of the present invention.

FIG. 10 shows a part of transmitter according to a fourth example of the present invention. In FIG. 10, like numerals are given to the elements that have been already explained in reference to FIG. 2. In this example, plural antennas are used for signal transmission. Therefore, the data channel processing portion 202-1 is provided additionally with a dedicated pilot multiplexing portion 102, an antenna weight control portion 104, and a weight setting portion. Moreover, each of the plural antennas is provided with elements such as the common pilot multiplexing portion 204, the IFFT portion 206 and the guard interval insertion portion 208, or the like. The dedicated pilot multiplexing portion 102 multiplexes the dedicated pilot channels in the signal to be transmitted. The antenna weight control portion 104 adjusts a weight for each of the plural antennas. Adjusting appropriately the weight realizes a beam pattern that has directionality in a specific direction or no directivity. The weight setting portion 106 sets the weight for each transmission antenna in accordance with a control signal from the antenna weight control portion 104. The weight is typically expressed by an amount of phase rotation to which amplitude may be added.

Figure 11:
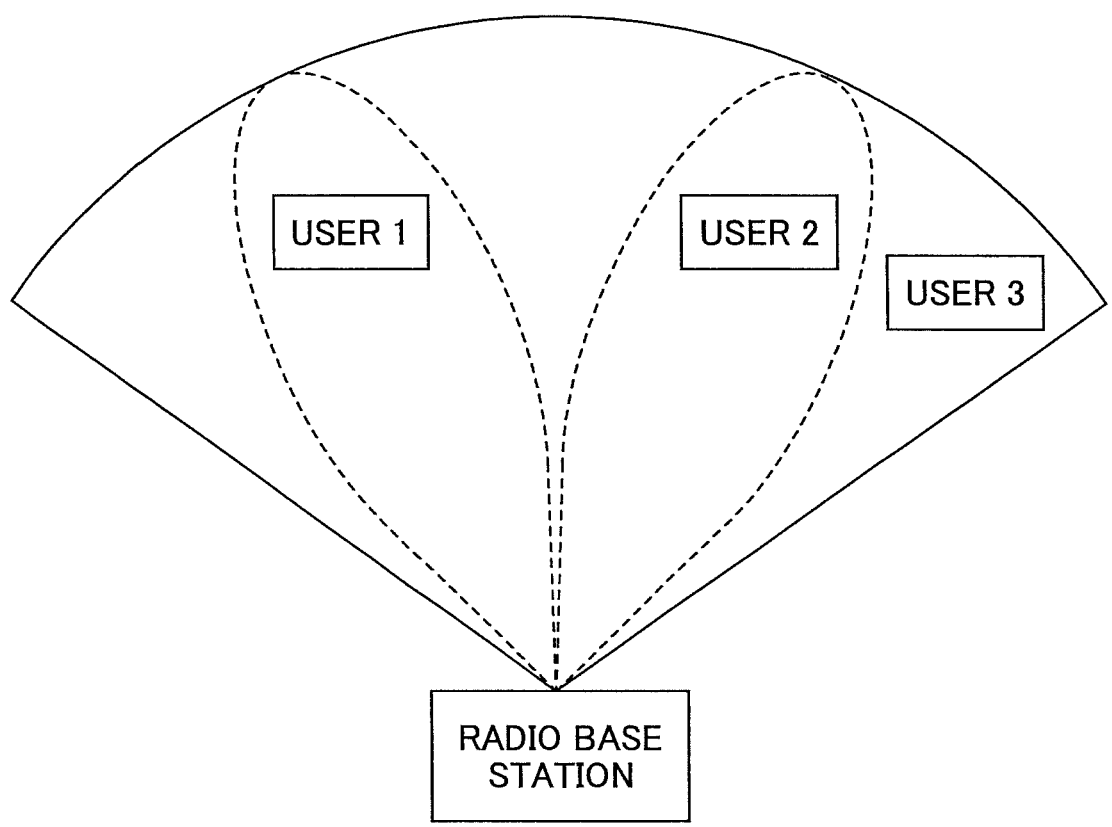
FIG. 11 shows a sector beam and a directional beam.

By the way, the common pilot channels and the shared control channels need to be provided to all the users, whereas the dedicated pilot channels need to be provided to a specific user. Therefore, the common pilot channels and the shared control channels are transmitted by a sector beam that covers an entire sector and the dedicated pilot channels are transmitted by a directional beam having directionality toward the user. FIG. 11 shows schematically the sector beam and the directional beams. In FIG. 11, the sector beam covering the entire sector having a wide directional angle of 120 degree is shown by a solid line, whereas the directional beams having a narrower directivity toward a user 1 and a user 2, respectively are shown by dotted lines.

Figure 12:
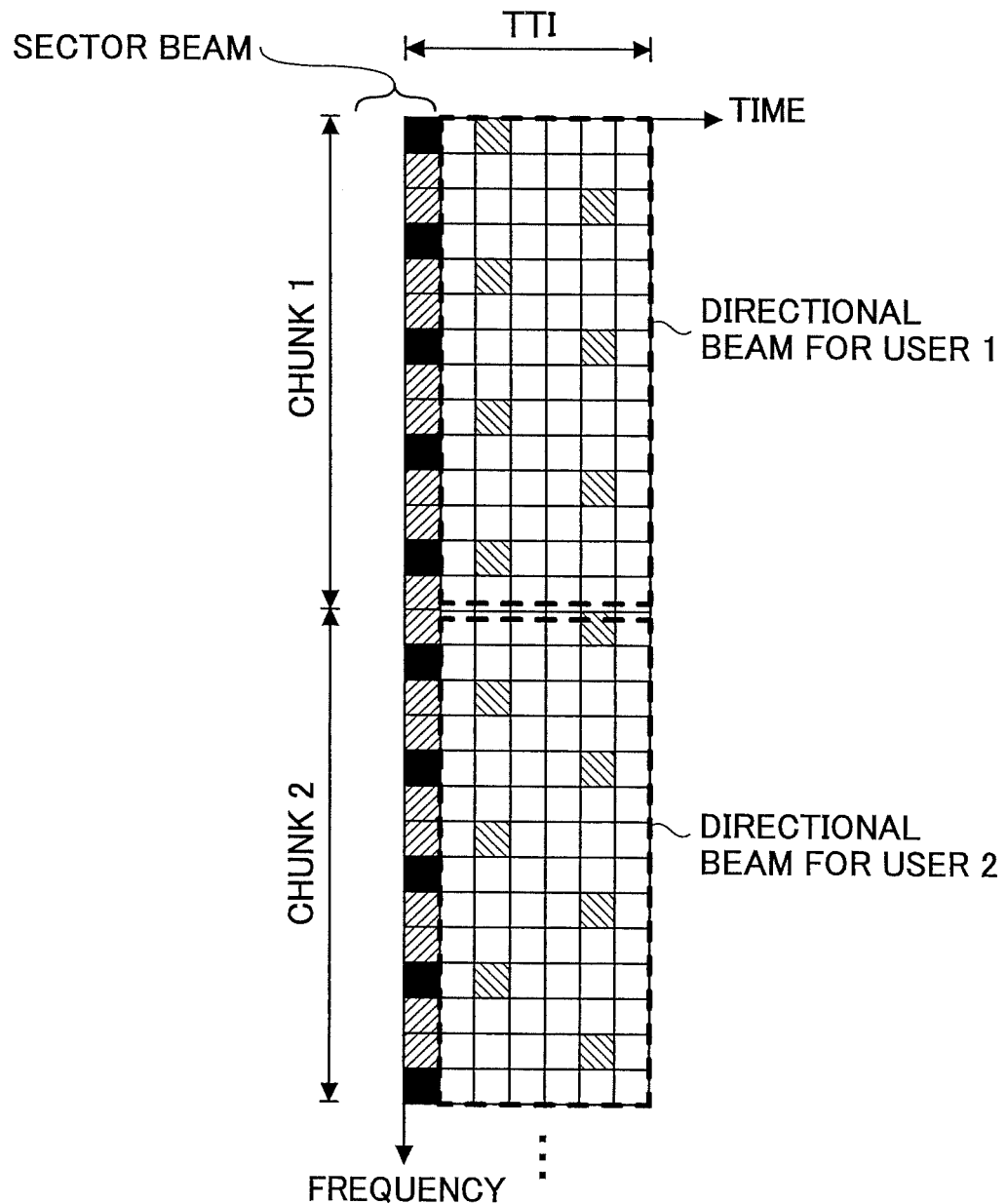
FIG. 12 shows an example of a channel configuration according to an example of the present invention.

FIG. 12 shows an example of a channel configuration when the frequency band is divided into plural frequency blocks or chunks. One user can use one chunk or more in accordance with transmission contents (data size or the like). In the illustrated example, a frequency chunk 1 is used by the user 1 and a frequency chunk 2 is used by the user 2. Since each user can use the dedicated pilot channels transmitted by the directional beam, in addition to the common pilot channels transmitted throughout the sector, the channel estimation regarding the direction of the directional beam is carried out with high accuracy.

Example 5

In the Example 4, the plural transmission antennas are used to form one directional beam. On the other hand, in a Multi-Input Multi-Output (MIMO) method, while plural antennas are independently used so as to concurrently transmit different signals from the corresponding antennas at the same frequency, the signals are received by plural reception antennas and separated using an appropriate signal separation algorithm. Independent use of the plural transmission antennas can produce plural transmission routes (channels), thereby enhancing a data transmission rate up to a level corresponding to a factor of the number of the transmission antennas. Since the transmission routes are formed by the corresponding antennas, the pilot channels are transmitted from the corresponding antennas and the channel estimation is carried out for the corresponding antennas. In addition, the transmissions need to be carried out in accordance with the least number of the antennas when the number $N_{TX}$ of the transmission antennas and the number $N_{RX}$ of the reception antennas are different. For example, when a radio base station transmits signals from four antennas, a transmission rate that has been expected from the use of the four antennas cannot be realized if a mobile station has only two reception antennas, leading to throughput that can be realized by only the two of the four transmission antennas. In other words, if the mobile station has only two antennas, use of the four antennas in the radio base station cannot contribute to an improvement of the data transmission efficiency. From this point of view, a way of transmission from the radio base station is changed in accordance with the number of the reception antennas provided in the mobile station in the fifth example of the present invention.

It is assumed for simplicity of explanation that the mobile station has two or four antennas and the radio base station has four antennas, although this example is applicable to the mobile station and the radio base station having any appropriate number of antennas. In this example, the common pilot channels and the shared control channels are received by any type of mobile station and the dedicated pilot channels are received by the mobile station having the four antennas.

Figure 13:
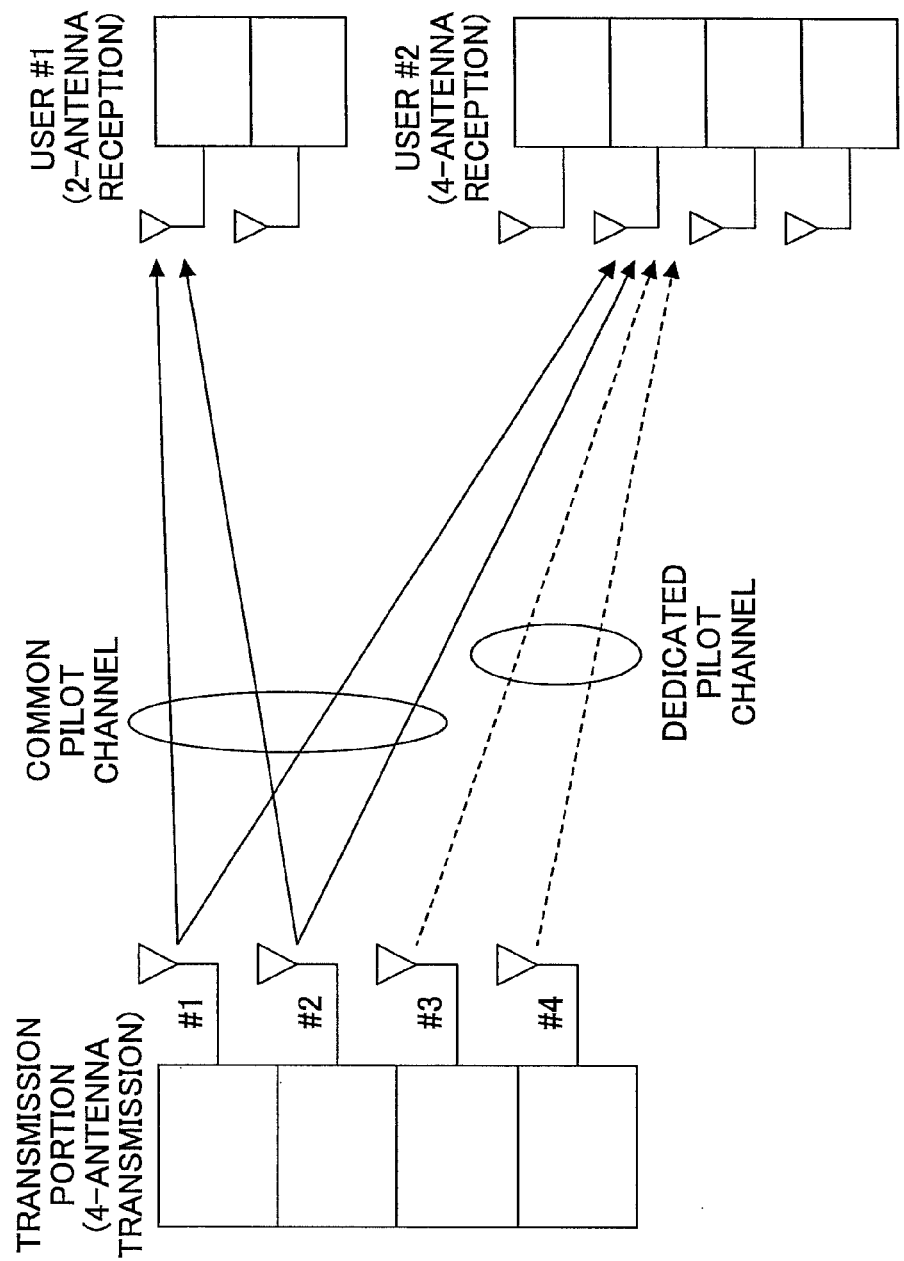
FIG. 13 shows a MIMO multiplexing method according to an example of the present invention.

FIG. 13 schematically shows the MIMO method according to this example of the present invention. As shown, the common pilot channels (and the shared control channels) are transmitted from a first antenna and a second antenna of a transmitter (radio base station). The common pilot channels are used by all mobile stations. In addition, the dedicated pilot channels are transmitted from a third antenna and a fourth antenna. The dedicated pilot channels are used only by a receiver (mobile station) having the four antennas.

Figure 14:
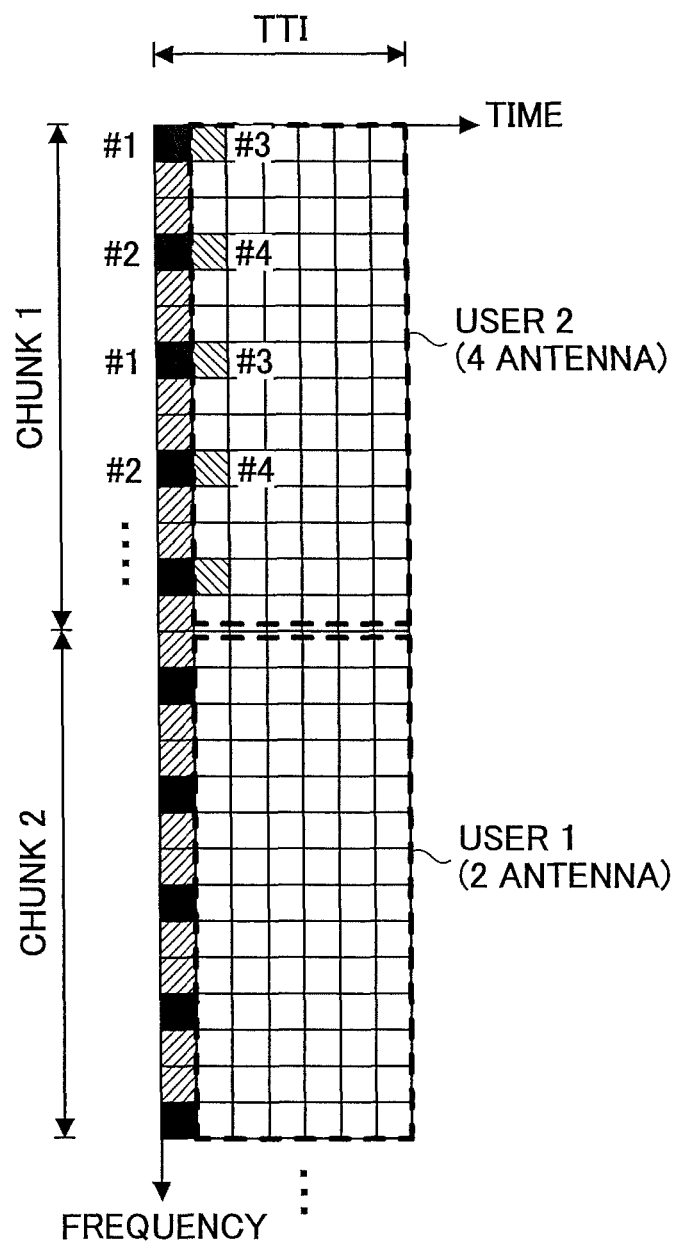
FIG. 14 shows an example of a channel configuration according to an example of the present invention.

FIG. 14 shows an example of a channel configuration when the frequency band is divided into plural frequency blocks or chunks. One user can use one chunk or more in accordance with transmission contents (data size or the like). In the illustrated example, a frequency chunk 1 is used by a user 2 and a frequency chunk 2 is used by a user 1. The common pilot channels and the shared control channels in the leading slot of the TTI are transmitted from the first and the second transmission antennas. A second symbol and beyond in the frequency chunk 2 are used to transmit the shared data channels to the user 1 having only the two antennas. The second symbol and beyond in the frequency chunk 1 are used to transmit the dedicated pilot channels from the third and the fourth antennas to the user 2 having the four antennas. With this, throughput can be improved for the user 1 and the user 2.

Figure 15:
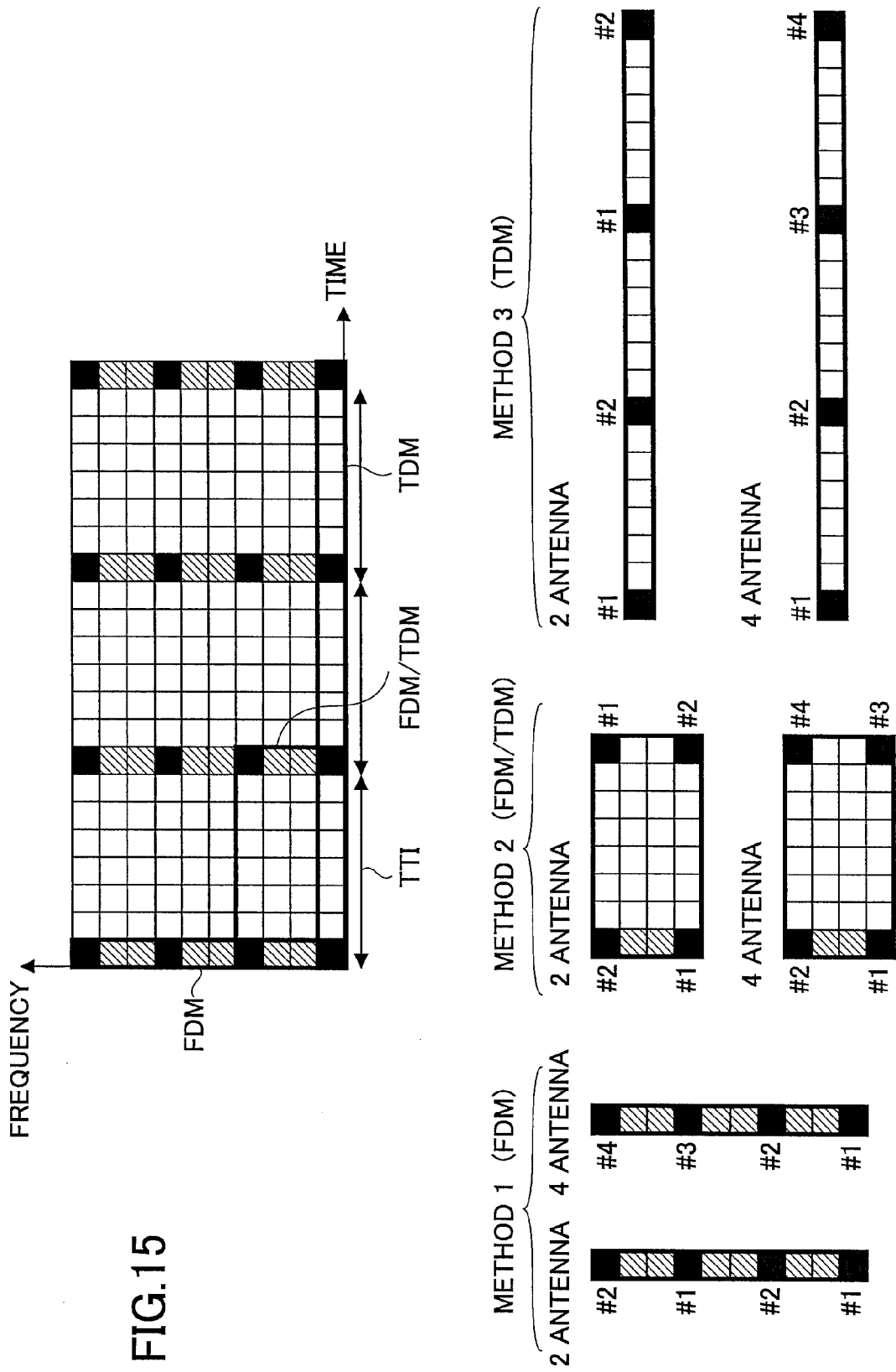
FIG. 15 shows various channel configurations of common pilot channels.

FIG. 15 shows several multiplexing methods about the common pilot channels. However, various multiplexing methods rather than the shown methods are applicable to this example of the present invention. In a method 1, the common pilot channels are multiplexed only in the frequency direction, which corresponds to the multiplexing method shown in FIG. 14. In a method 2, the common pilot channels are multiplexed in the time and the frequency directions. In a method 3, the common pilot channels are multiplexed only in the time direction.

Example 6

Downlink pilot channels can be divided into the common pilot channels and the dedicated pilot channels. The common pilot channels may be transmitted by the sector beam or a multi-beam due to a fixed antenna weight (a fixed beam pattern) using plural antennas. When the multi-beam is used, the entire sector is covered by a predetermined number of directional beams.

(Pilot Channel)

The common pilot channels may be used to identify a sector to which a user concerned belongs out of plural sectors in the same cell. All the sectors in the same cell use cell-specific scramble codes. The common pilot channels may be used for cell-search or handover, or for measurement of reference level in adjacent cells/sectors. In addition, the common pilot channels may be used for quality measurement to obtain channel quality information (CQI) for the purpose of scheduling in accordance with instantaneous channel quality. The CQI may be used, for example, in an adaptive link control. The common pilot channels may be used for channel estimation of a physical channel transmitted by the sector beam or the multi-beam.

The dedicated pilot channels may be transmitted by the sector beam or the multi-beam, or by an adaptive beam (adaptive directional beam) produced adaptively for each user. The adaptive directional beam and the directional beam included in the multi-beam are the same in that the beams have a strong antenna gain in a particular direction. However, the directional beam is produced at a fixed weight whereas the weight of the adaptive directional beam is changed in accordance with a position of the mobile station. Namely, the directional beam is a fixed directional beam and the adaptive directional beam is a variable directional beam whose directionality is variable. The dedicated pilot channels are used (though not always used) in accordance with transmission channel quality that is dependent on the user or an environment. The dedicated pilot channels may be transmitted by the adaptive beam produced adaptively for each user. The dedicated pilot channels may be used to assist the channel estimation of the physical channel transmitted by the sector beam or the multi-beam, although the common pilot channels are basically used for the channel estimation. The dedicated pilot channels may be used for the channel estimation of the physical channel transmitted by the adaptive beam. The dedicated pilot channels may be used for the CQI measurement of the physical channel transmitted by the adaptive beam.

Figure 16:
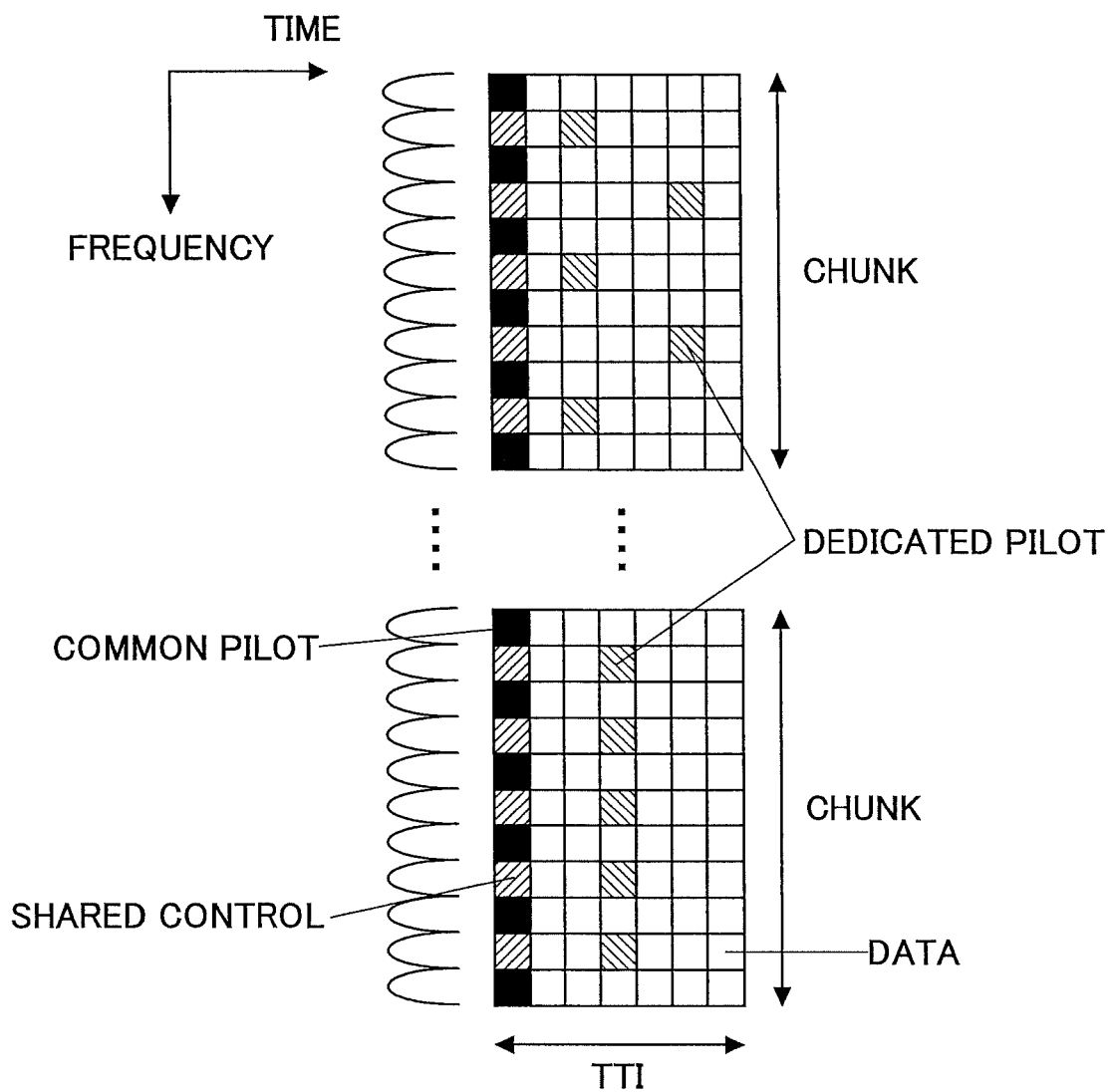
FIG. 16 shows a channel configuration of dedicated/common pilot channels.

FIG. 16 shows an example of a channel configuration of the common pilot channels and the dedicated pilot channels. In the illustrated example, the common pilot channels are mapped in sub-carriers at predetermined frequency intervals in one symbol (or one time slot). On the other hand, the dedicated pilot channels are mapped in other sub-carriers at predetermined frequency intervals in another symbol or more. By the way, the common pilot channels may be mapped in one symbol or more.

(Beam)

The common pilot channels may be transmitted by the sector beam and used for demodulation of the physical channel, namely for the channel estimation and reception synchronization. In addition, the common pilot channels may be transmitted from a MIMO-based transmitter. Moreover, the dedicated pilot channels may be additionally used in accordance with the user or the environment so as to improve the channel estimation accuracy. When a specific chunk used for the shared data channels is used only by one or a few users, the dedicated pilot channels may be additionally used in accordance with the transmission environment of the user (a moving velocity, a delay spread, a received Signal-to-Interference plus Noise power Ratio (SINR), or the like), thereby further improving the channel estimation accuracy. In a multicast/broadcast channel, the dedicated pilot channels are additionally used taking account of a user in the worst transmission environment in the cell concerned, thereby improving the channel estimation accuracy. On the other hand, the reference level measurement for the cell-search or the handover and the CQI measurement for the scheduling, the adaptive link control, or the like are carried out principally using the common pilot channels may be carried out supplementarily using the dedicated pilot channels.

The common pilot channels may be used for demodulation of the physical channel transmitted by the multi-beam, namely for the channel estimation and reception synchronization. In addition, as is the case with the sector beam, the dedicated pilot channels may be additionally used in accordance with the user or the environment, thereby improving the channel estimation accuracy. On the other hand, the reference level measurement for the cell-search or the handover and the CQI measurement for the scheduling, the adaptive link control, or the like are carried out principally using the common pilot channels and may be carried out supplementarily using the dedicated pilot channels. When there are a large number of multi-beams in the same cell, pilot sequences to be used for identifying a beam to which a particular user belongs may be re-used in the same cell, thereby reducing the number of the pilot sequences to be used.

Figure 17:
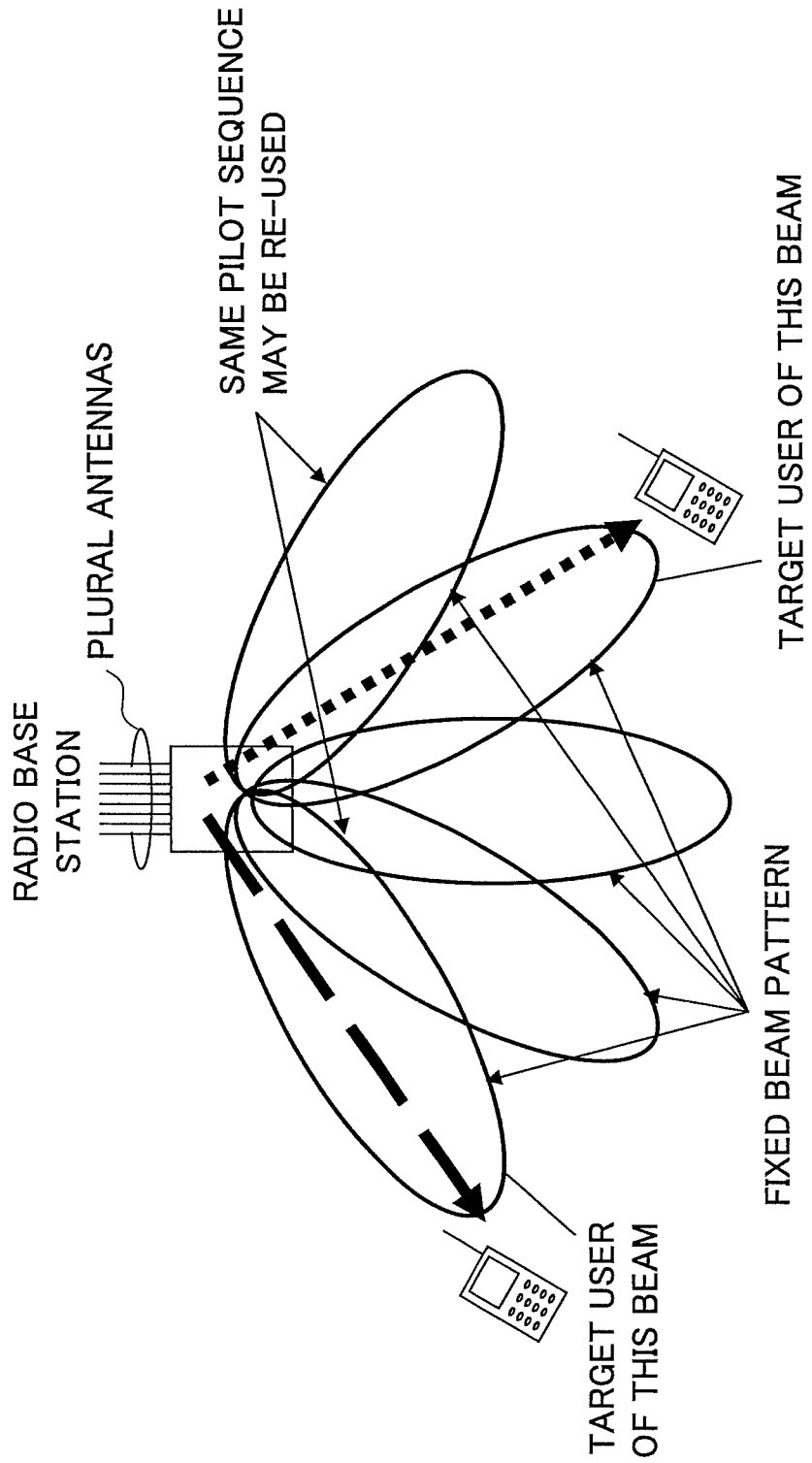
FIG. 17 schematically shows the pilot channels to be transmitted by a multi-beam.

FIG. 17 schematically shows the pilot channels transmitted by the multi-beam. In the illustrated example, five directional beams (fixed beam patterns) are used. A pilot sequence is re-used by two directional beams that are directed in largely different directions among the five beams.

Since the adaptive (directional) beam forms adaptively transmission beams for the corresponding users, the dedicated pilot channels are used for the channel estimation. In addition, the common pilot channels may be used in addition to the dedicated pilot channels in order to improve the channel estimation accuracy when there is a higher channel correlation between the multi-beam transmission and the adaptive beam transmission. On the other hand, the reference level measurement for the cell-search or the handover and the CQI measurement for the scheduling, the adaptive link control, or the like are carried out principally using the common pilot channels transmitted by the sector beam and the multi-beam.

Figure 18:
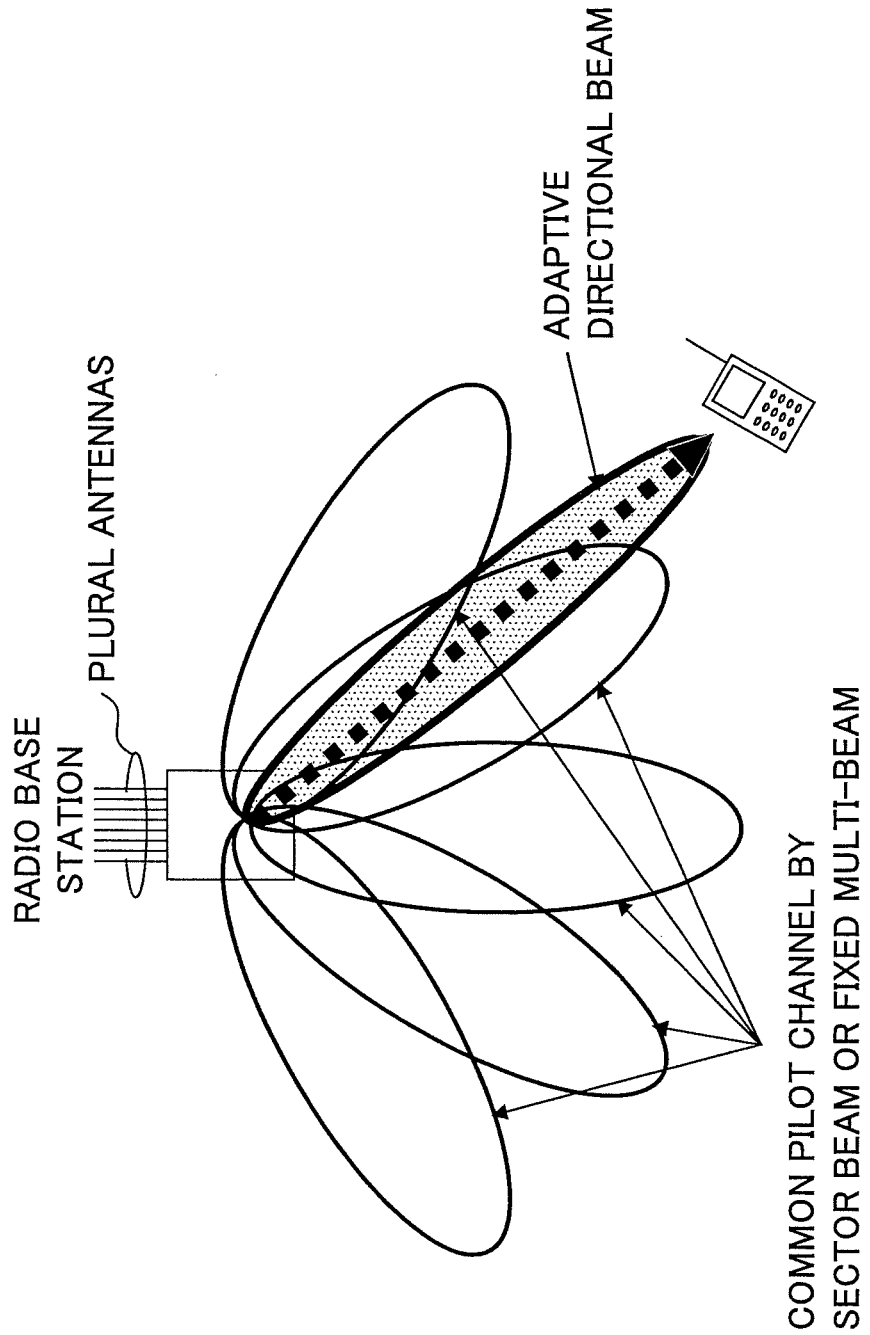
FIG. 18 schematically shows the pilot channels to be transmitted by an adaptive directional beam.

FIG. 18 shows the pilot channels transmitted by the adaptive directional beam.

(Pilot Channel Configuration)

The common pilot channels and the dedicated pilot channels may be multiplexed periodically in every TTI. Depending on the user and the environment, the dedicated channels are used so as to improve the channel estimation accuracy. When one chunk is used exclusively by one or several user(s) regarding the shared data channels under situations of, for example, high mobility, a large delay spread, or an extremely low SINR, the dedicated pilot channels are allocated in addition to the common pilot channels, thereby enabling accurate channel estimation. In the multicast/broadcast channel, the dedicated pilot channels are used in addition to the common pilot channels, thereby improving user quality of the user which has had the worst quality. Additional user-dependent dedicated pilot channel information in the shared data channels is provided by a control signaling channel. Therefore, by using more pilot symbols in lower delay conditions, high quality demodulation of the shared data channels can be realized. In the multicast/broadcast channel, additional environment-dependent dedicated pilot channel information is provided by the control signaling channel based on the user quality in the worst environment. By using more pilot symbols in lower delay conditions, a high quality multicast/broadcast channel is provided.

The pilot channels may be mapped at higher density taking more account of the frequency domain rather than the time domain. More pilot channels may be allocated in the frequency domain rather than in the time domain. Namely, the pilot channel density may be higher in the frequency domain than in the time domain. Although channel fluctuations in the time domain might be less significant when the TTI length is relatively short, it is expected that the channel fluctuations in the frequency domain become significant due to time dispersiveness in the frequency selective multi-path fading. Therefore, it is more advantageous to densely map the pilot channels than to divide the pilot channels into sub-carriers for allocation according to a TDM method.

TDM-based and/or FDM-based multiplexing may be employed by carrying out staggered mapping from the top of the TTI. In the staggered mapping, channels are mapped at predetermined intervals in one time slot, whereas the channels are mapped at the predetermined intervals in different frequencies in other time slots, as shown in FIG. 16. The common pilot channels and the dedicated pilot channels may be mapped in each TTI in accordance with the staggered mapping. The common pilot channels may be mapped highly preferentially before the dedicated channels. When the pilot channels are mapped at the top of each TTI, at least the following advantages are exerted. When the control signaling channels are mapped at the top of each TTI along with the common/dedicated pilot channels, the control signaling channels are reliably demodulated by accurate channel estimation even under a situation where channel quality fluctuation takes place due to various delay spreads and Doppler frequencies. When the control signaling channels are mapped at the top of each TTI and no traffic data are transmitted by a chunk (namely when only control signaling bits are transmitted), it is advantageous that user equipment (UE) performs efficient cyclic reception.

Figure 19:
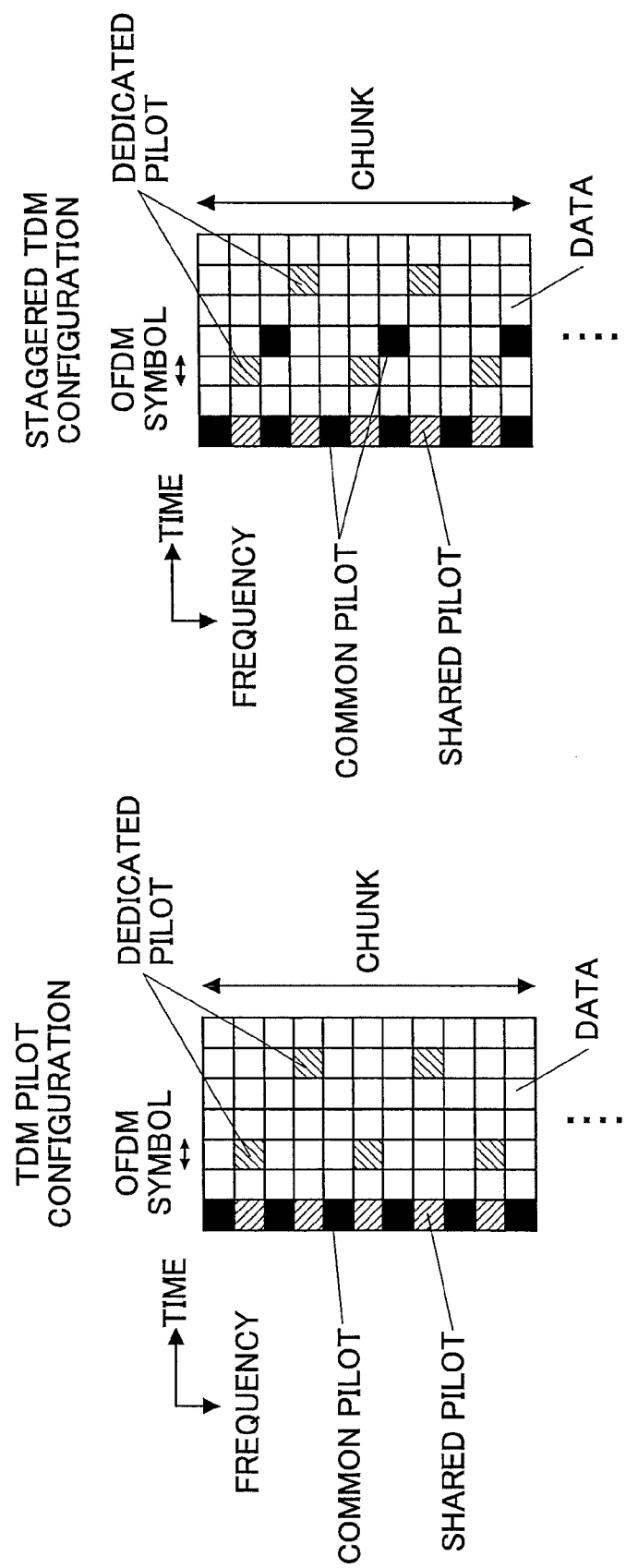
FIG. 19 shows an example of channel allocation of the dedicated/common pilot channels in accordance with a TDM method.

FIG. 19 shows an example of allocation of the common and the dedicated pilot channels.

Figure 20A:
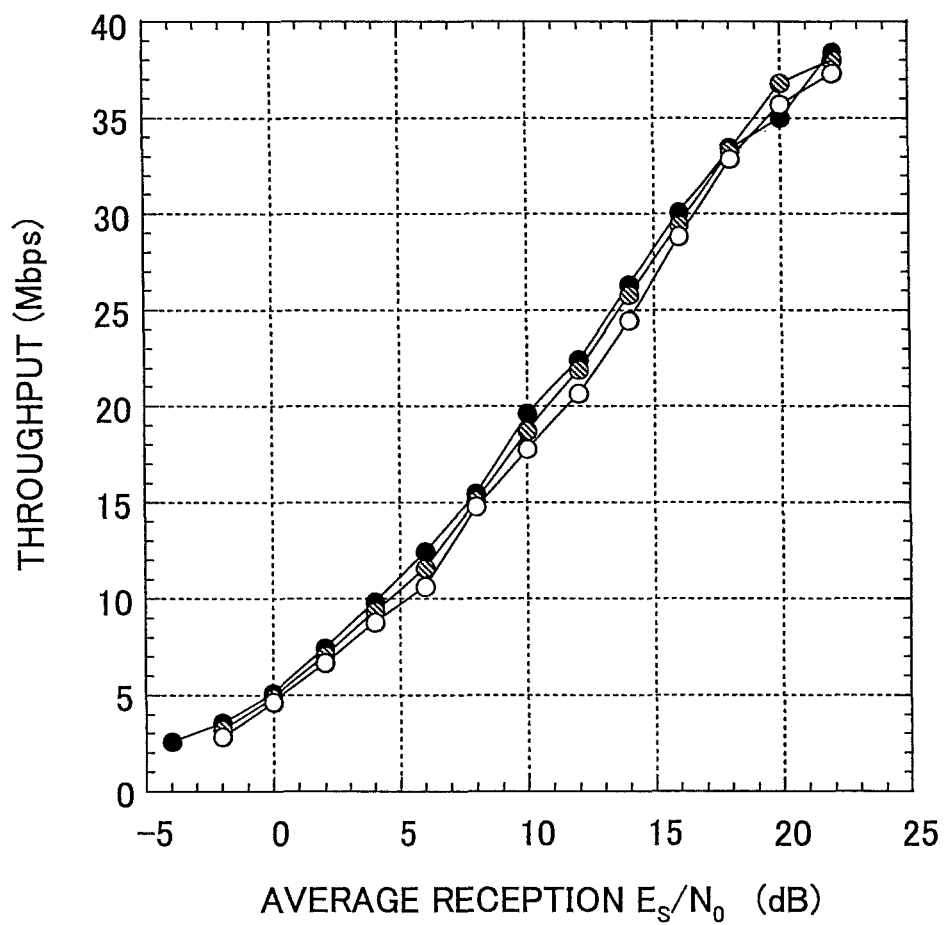
FIG. 20A shows a relationship between throughput and an average reception $E_s/N_0$ when the number $N_{stg}$ of staggered mapping is changed.
Figure 20B:
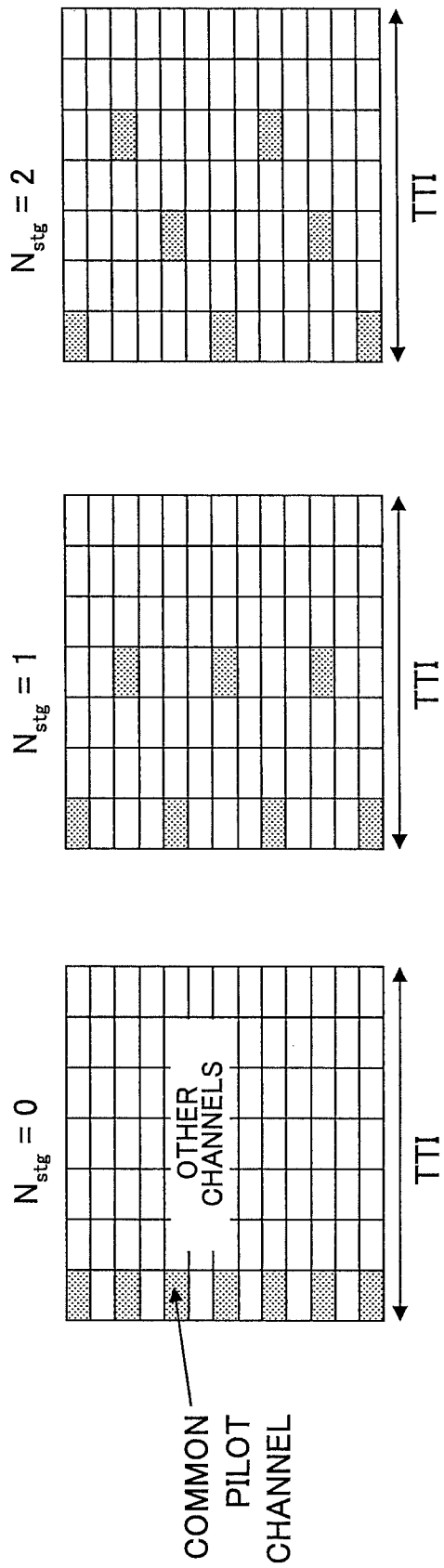
FIG. 20B shows an example of channel mapping when the number $N_{stg}$ of the staggered mapping is 0, 1, and 2.

FIG. 20A shows simulation results obtained in accordance with an example of the present invention, in which a relationship between energy per symbol per noise power spectral density ($E_s/N_0$) and throughput. Three kinds of plots in FIG. 20A correspond to simulation results obtained by three numbers ($N_{stg}$=0, 1, 2) of time slots to be subjected to the staggered mapping of the pilot symbols, respectively. Channel configurations corresponding to $N_{stg}$=0, 1, 2, are shown in FIG. 20B, respectively. A curve with open circles in FIG. 20A shows the relationship at $N_{stg}$=0; a curve with hatched circles shows the relationship at $N_{stg}$=1; and a curve with closed circles shows the relationship at $N_{stg}$=2. A moving velocity at which a mobile station moves is assumed to be 120 km/h in these simulations. In FIG. 20A, as the time slot number $N_{stg}$ to be subjected to the pilot symbol mapping is increased, the throughput is further improved, which indicates effectiveness of the staggered mapping. This is thought to be because of an improved traceability of the channel estimation in the time domain.

In the mapping method of the common pilot channels and the dedicated pilot channels, the pilot symbols may be discontinuously allocated in the frequency domain and the time domain. For example, discontinuous mapping along the frequency domain of the OFDM symbols may be employed. When the pilot symbols are allocated in a discontinuously dispersive manner in the frequency domain and the time domain, the following advantage is exerted. First, since the sub-carriers that are allocated to the pilot symbols in the frequency domain are thinned, a reduction in data transmission efficiency, which is caused by inserting the pilot symbols, can be prevented while the channel estimation accuracy is kept comparable with the channel estimation accuracy realized when the sub-carriers are not thinned. Allocation amount in the time domain is reduced. Transmission power of the common pilot channels needs to be changed depending on a target cell radius in an actual cellular method. Therefore, the pilot symbols are thinned in the frequency domain, namely the pilot symbols and other channels are multiplexed and transmitted in the same OFDM symbols, thereby maintaining overall transmission power and flexibly changing the transmission power of the common pilot channels.

Example 7

In an example 7 of the present invention, there is described a method utilizing orthogonal code sequences in sectors of the same cell site. This method can be employed not only between plural sectors, which are included in a cell, but also between cells. In conventional W-CDMA, scrambling is performed using different spreading codes for different sectors; a received signal is scrambled by the corresponding scramble codes so as to produce the pilot channels; and the channel estimation or the like is performed. Since the scramble codes which are different in each sector are determined at random, the pilot channels are interfered with due to inter-code interference from the symbols whose sub-carrier and sub-frame are the same in the sector (inter-sector interference). As a result, it becomes relatively difficult to perform highly accurate channel estimation and cell search, or it takes more time even if the channel estimation and the cell search can be performed. This results in a disadvantage especially when the mobile station requires a fast hand-over or moves frequently across sector boundaries. In regard to this point, it seems possible to improve signal quality to some extent under a multi-path transmission environment by employing the OFDM method in data channel downlink and eliminating the need for multiplying the data channels by the scramble code. However, since the pilot channels are multiplied by the scramble codes that are different for each sector in order to distinguish the sectors, reception qualities of the pilot channels are not substantively improved, which makes still difficult the highly accurate channel estimation or the like. The seventh example has been contemplated in view of such a disadvantage and directed to an improvement of reception qualities of the pilot channels in OFDM method downlink.

According to this example, sector-specific orthogonal sequences are used in the pilot channels in addition to cell-specific orthogonal code sequences. With this, the pilot channels are prevented from being interfered from adjacent sectors in the same cell. Since such inter-sector interference is prevented, the channel estimation accuracy can be improved. Improvement of the channel estimation accuracy is advantageous in concurrent transmissions related to a fast sector selection and soft-combining.

FIG. 21A schematically shows use of a pilot sequence orthogonal between sectors (or beams) according to this example. A terminal that is to perform handover at a sector edge can perform the channel estimation concurrently based on the pilot signals from two base stations, thereby enabling high accuracy and high speed channel estimation. For example, a user #1 existing at an edge or end of a sector (namely, a user that is to perform the fast sector selection or the soft-combining) distinguishes the sectors by despreading the orthogonal sequences so as to enable accurate channel estimation. A user #2 that is not to perform the fast sector selection or soft-combining can use each pilot symbol (or, takes account of the cell-specific and/or the sector-specific orthogonal code) so as to perform the channel estimation.

FIG. 21B shows a pilot channel generation portion used in a transmitter according to this example of the present invention. The transmitter is typically a radio base station. The pilot channel generation portion includes a pilot sequence portion 2102 that provides a pilot channel sequence, a scramble code portion 2104 that provides a scramble code, an orthogonal code portion 2106 that provides different spreading symbols (orthogonal codes) for different sectors, a multiplication portion 2108 that multiplies the scramble codes by the orthogonal codes, and a multiplication portion 2110 that multiplies the pilot sequence by an output from the multiplication portion 2108. The pilot sequence has been known by the radio base station and the mobile station. The scramble code is a random sequence to be commonly used by plural sectors. The orthogonal codes are determined for each sector so as to be orthogonal with one another.

FIG. 22 shows a specific example of the orthogonal codes multiplied on the pilot sequence. As shown, codes indicated by (1, 1, 1, 1, 1, 1, 1, 1, . . . ) are mapped at intervals of one sub-carrier in a sector #1; codes indicated by (1, −1, 1, −1, 1, −1, 1, −1, . . . ) are mapped at intervals of one sub-carrier in a sector #2; and codes indicated by (1, −1, −1, 1, 1, −1, −1, 1, . . . ) are mapped at intervals of one sub-carrier in a sector #3. These codes are orthogonal with one another.

FIG. 23 shows another specific example of the orthogonal codes multiplied on the pilot sequence. As shown, codes indicated by (1, 1, 1, 1, 1, 1, 1, 1, . . . ) are mapped at intervals of one sub-carrier in the sector #1; codes indicated by (1, $e^{j2/3\pi}$, $e^{-j2/3\pi}$, 1, $e^{j2/3\pi}$, $e^{-j2/3\pi}$, 1, $e^{j2/3\pi}$, . . . ) are mapped at intervals of one sub-carrier in the sector #2; and codes indicated by (1, $e^{-j2/3\pi}$, $e^{j2/3\pi}$, 1, $e^{-j2/3\pi}$, $e^{j2/3\pi}$, 1, $e^{-j2/3\pi}$, . . . ) are mapped at intervals of one sub-carrier in the sector #3. Such codes can be orthogonal with one another.

Figure 24:
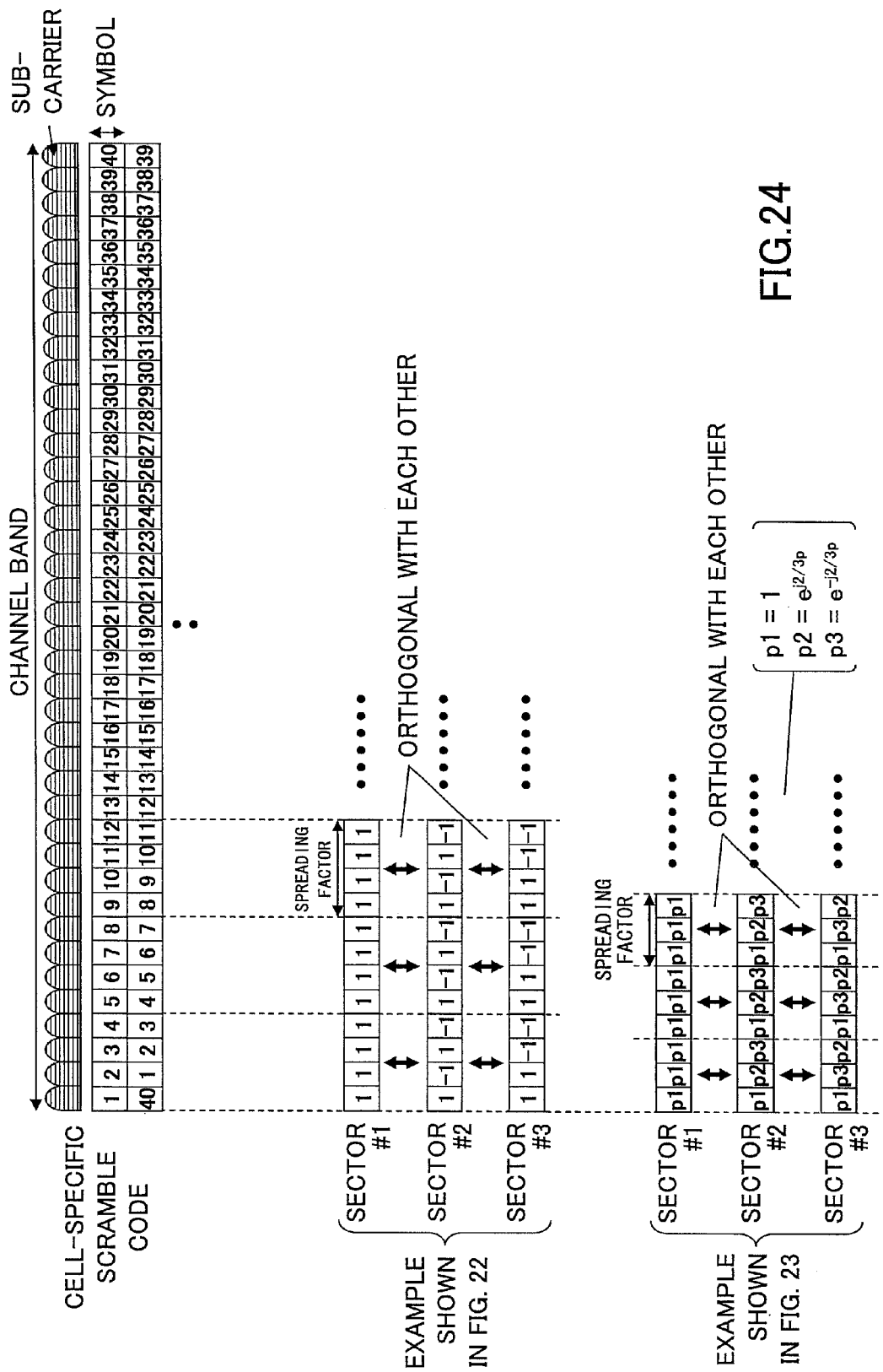
FIG. 24 shows a relationship between a scramble code and an orthogonal code.

FIG. 24 shows a correspondence relationship between the scramble codes and the orthogonal codes. In the illustrated example, 40 sub-carriers are assumed in an available channel band and various types of data are associated with the corresponding sub-carriers so as to perform transmission according to the OFDM method. It goes without saying that the illustrated numerals are just examples. The channel band may be the entire band available to the system focused on, or one chunk. In the illustrated example, the scramble code is expressed by 40 data sequences and mapped to the corresponding sub-carriers. In the drawing, numerals 1 through 40 related to the scramble code express the codes that compose the scramble code. The scramble code in a second line in FIG. 1 is shifted by one individual code from the scramble code in a first line, since the scramble code is transmitted so that the correspondence relationship is shifted by one individual code in the frequency axis direction, although the two scramble codes used are the same. With this, a signal in the frequency axis direction can be averaged out.

In the specific example described in reference to FIG. 22, the scramble codes are multiplied by the orthogonal codes of (1, 1, 1, 1, . . . ) and the resultant codes are multiplied by the pilot sequence in the sector #1; the scramble codes are multiplied by the orthogonal codes of (1, −1, −1, 1, . . . ) and the resultant codes are multiplied by the pilot sequence in the sector #2; and the scramble codes are multiplied by the orthogonal codes of (1, 1, −1, −1, . . . ) and the resultant codes are multiplied by the pilot sequence in the sector #3. In the specific example described in reference to FIG. 23, the scramble codes are multiplied by the orthogonal codes of (1, 1, 1, 1, . . . ) and the resultant codes are multiplied by the pilot sequence in the sector #1; the scramble codes are multiplied by the orthogonal codes of (1, $e^{j2/3\pi}$, $e^{-j2/3\pi}$, . . . ) and the resultant codes are multiplied by the pilot sequence in the sector #2; and the scramble codes are multiplied by the orthogonal codes of (1, $e^{-j2/3\pi}$, $e^{j2/3\pi}$, . . . ) and the resultant codes are multiplied by the pilot sequence in the sector #3.

Figure 25:
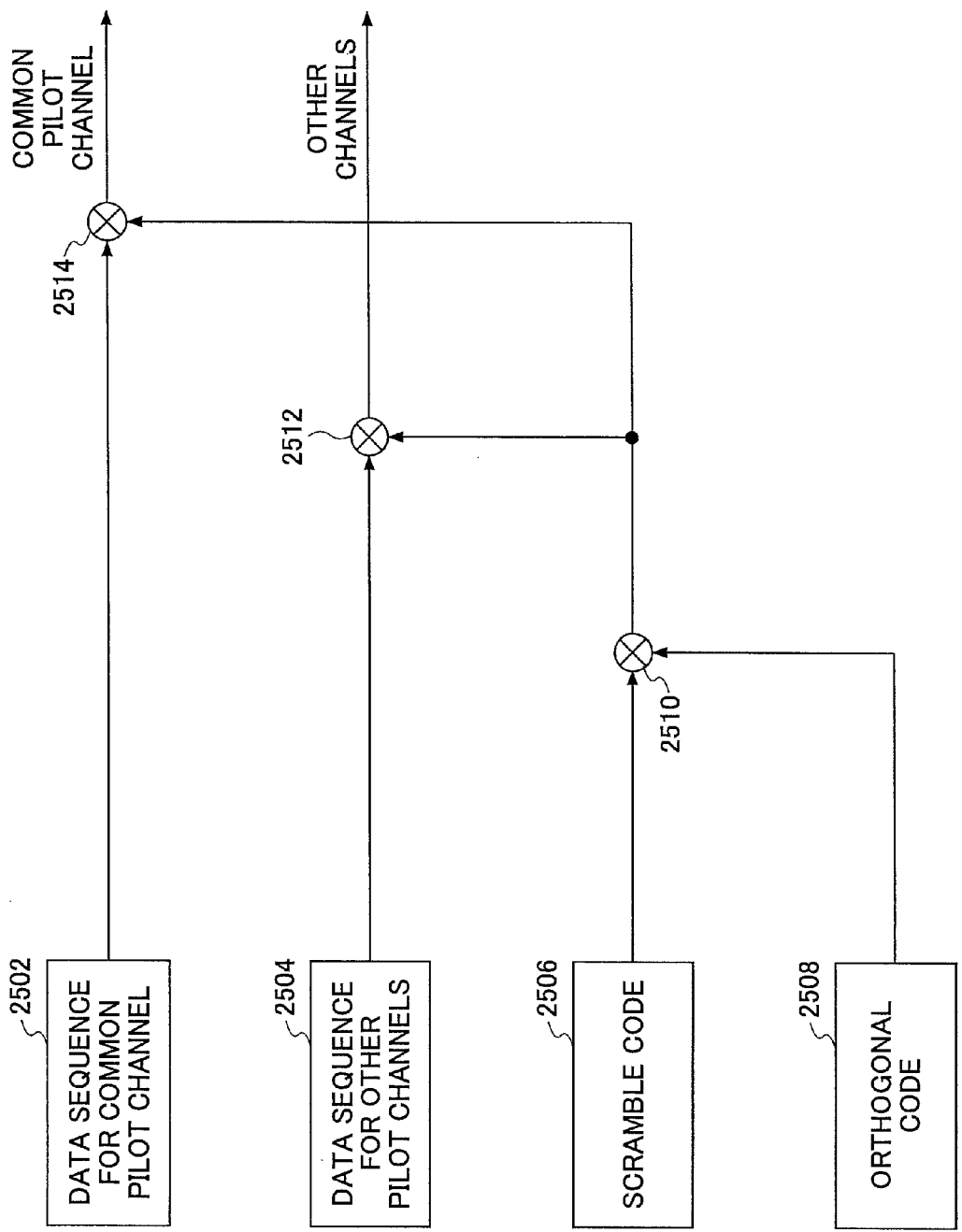
FIG. 25 shows a first example in which the common pilot channel and other channels are multiplied by the scramble code and the orthogonal code.

FIG. 25 shows an example in which the common pilot channels and other channels are multiplied by the scramble code and the orthogonal code. In FIG. 25, there are illustrated a providing portion 2502 that provides a sequence for the common pilot channels, a providing portion 2504 that provides a sequence for other channels, a scramble code portion 2506 that provides the scramble code, an orthogonal code portion 2508 that provides different sectors with different spreading code sequences (orthogonal codes), a multiplication portion 2510 that multiplies the scramble code and the orthogonal code, another multiplication portion 2512 that multiplies the data sequence for the other channels by an output from the multiplication portion 2510, a yet another multiplication portion 2514 that multiplies the pilot sequence by an output from the multiplication portion 2512. As stated above, the scramble code is commonly determined for the plural cells, and the orthogonal codes are determined so as to be different (orthogonal) for different cells. In the illustrated example, the common pilot channels and other channels are multiplied by the same scramble code and the same orthogonal code.

Figure 26:
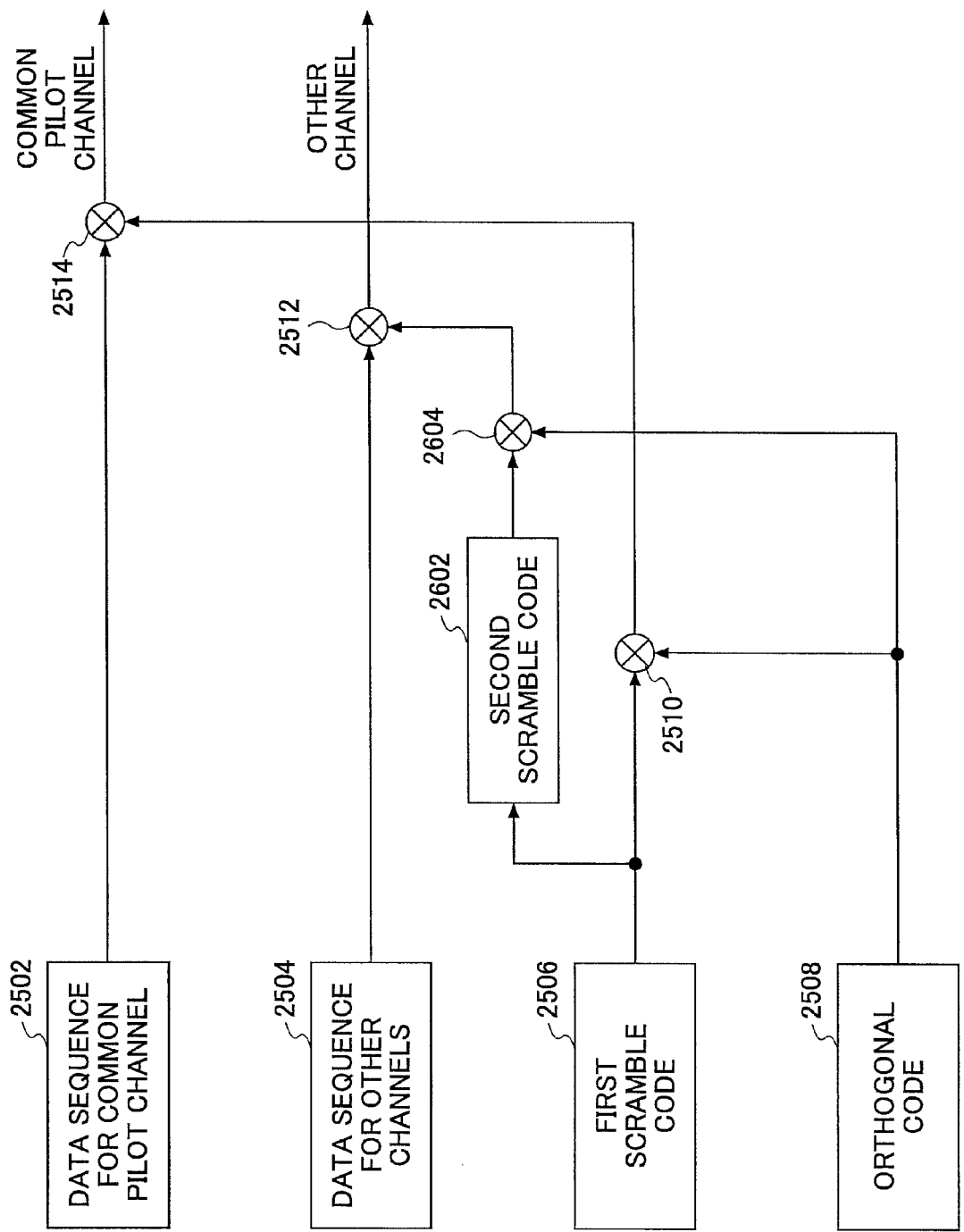
FIG. 26 shows a second example in which the common pilot channel and other channels are multiplied by the scramble code and the orthogonal code.

FIG. 26 shows another example in which the common pilot channels and other channels are multiplied by the scramble code and the orthogonal code. Like numerals are given to elements and components that have already been described in reference to FIG. 25 and repetitive explanations are omitted. In FIG. 26, there are additionally illustrated a second scramble code portion 2602 and a multiplication portion 2604 that multiplies a second scramble code by the orthogonal code. The (first) scramble code portion 2506 outputs the (first) scramble code to be commonly used by the plural sectors. In accordance with a predetermined rule instructed by the first scramble code portion 2506, the second scramble code portion 2602 outputs a second scramble code to the multiplication portion 2604. The output from the multiplication portion 2604 is multiplied by the data sequence for other channels (excluding the common pilot channels). Therefore, other channels are multiplied by the second scramble code and the orthogonal code, whereas the common pilot channels are multiplied by the first scramble code and the orthogonal code. With this, the common pilot channels are distinguished from other channels by their spreading codes. In this example, since the second scramble code may be derived from the first scramble code, the transmitter can easily search for any channel as far as the derivation rule is known.

Figure 27:
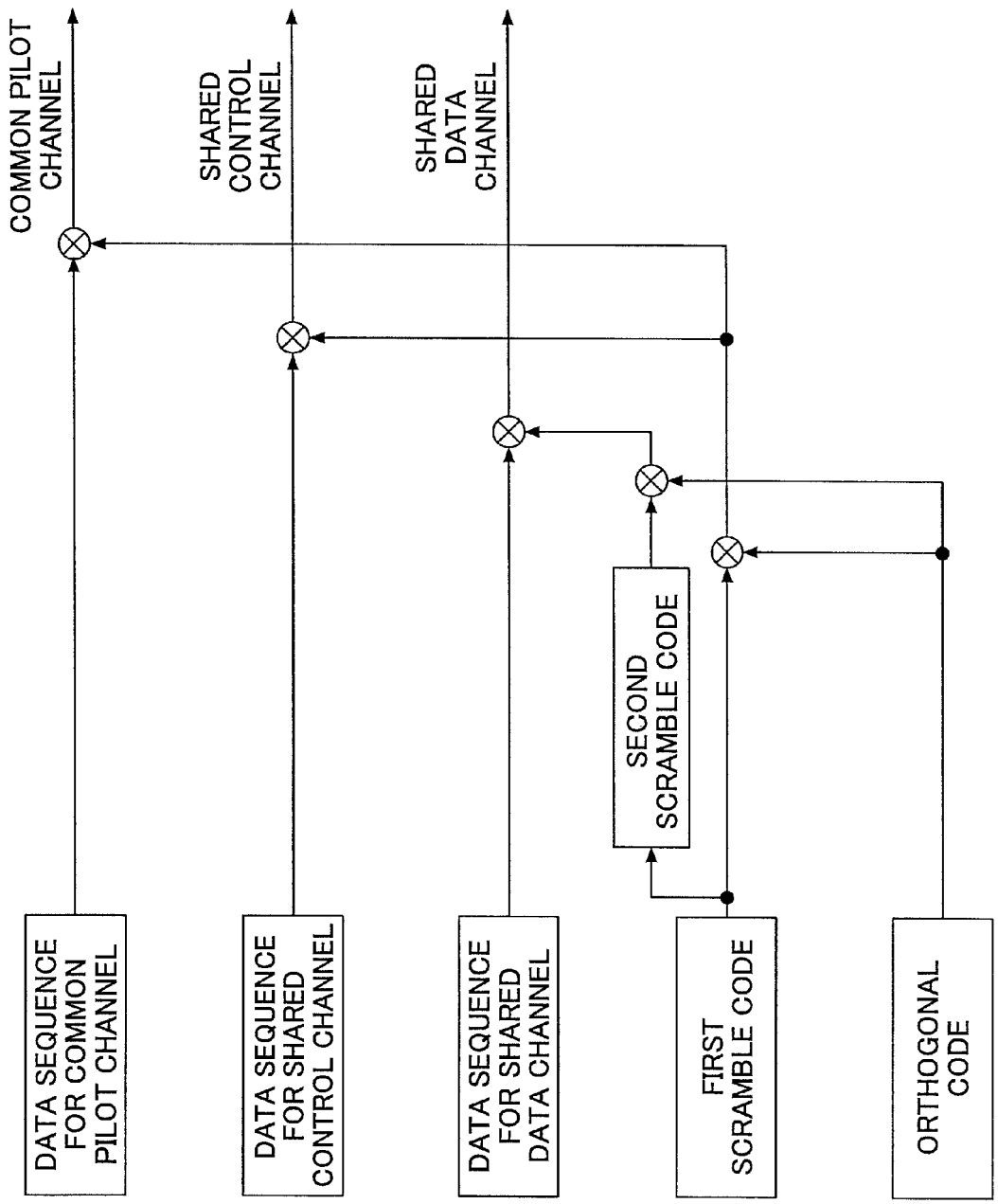
FIG. 27 shows an example of a combination of the examples shown in FIGS. 25 and 26.

FIG. 27 shows a combination of the specific examples shown in FIGS. 25 and 26. Without being limited to the illustrated combination, any combination of channels may be employed as an example of the present invention. The illustrated combination is advantageous in that the shared data channels whose spreading factor may change can be easily distinguished from channels whose spreading factor is kept at a constant level.

In addition to the above-mentioned suppression of interference in the pilot channels, transmission power of the shared data channels may be adjusted.

Figure 28:
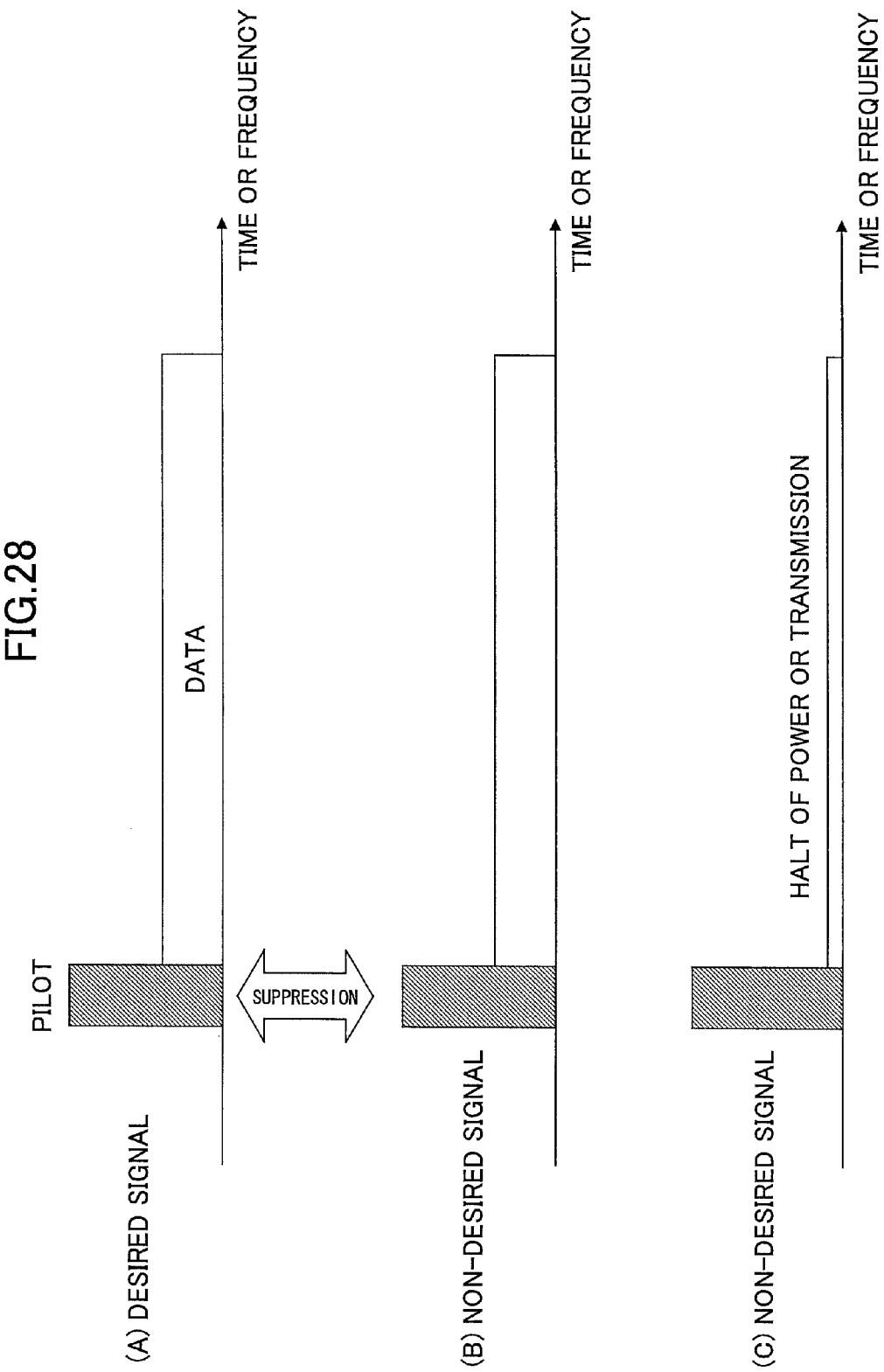
FIG. 28 shows the pilot channel and data channel of a desired signal and a non-desired signal.

FIGS. 28(A), (B), (C) show signals received by a certain user. FIG. 28(A) shows a signal (desired signal) to be received by a certain user from a cell or a sector to which the user is connected. In the drawing, the pilot channel is illustrated higher than the data channel since the pilot channel is transmitted and received with higher electric power than the data channel. FIG. 28(B) shows a signal (non-desired signal) that is not the desired signal for the user. The non-desired signal indicates a signal from a cell (or a sector) to which the user is not connected, and is an interference signal to the desired signal. In this example, the interference to the pilot channel is suppressed because different orthogonal codes are used for the pilot channels of the desired signal and the pilot channels of the non-desired signal. FIG. 28(C) schematically shows that the transmission power for transmitting the data channel from the radio base station (transmission power for the non-desired signal) is reduced, or the transmission is halted, so that the interference between the desired signal and the non-desired signal is reduced by adjusting transmission timing or downlink frequency bands between the radio base stations or the sectors. More specifically, the transmission power for the non-desired signal is limited to less than a predetermined value. With this, interference between data channels, which may be a concern in the example of FIG. 28(B), can be suppressed. Or, the user may perform soft-combining by concurrently transmitting identical data channels instead of reducing the transmission power for the non-desired signal (to zero, if necessary).

Example 8

In an eighth example, there is described an orthogonal pilot mapping for MIMO transmission. Orthogonal multiplexed pilot channels may be used in an antenna gain technique such as MIMO multiplexed transmission, MIMO diversity transmission, and adaptive array antenna transmission. Only as an example, the pilot channels are transmitted according to the MIMO transmission from all the antennas in the transmitter. This is because the pilot channels are required to measure a CQI value for all the signal transmissions. All overheads of the common pilot symbols are the same regardless of the number of transmission antennas, because corresponding areas in cell coverage for the data channels are assured by using the MIMO transmission. In the MIMO transmission, the channel estimation is improved by further using the dedicated pilot channels (in the case of four branch MIMO transmission, the number of the pilot symbols per antenna becomes one-fourth of the number of the pilot symbols in single antenna transmission). Adaptive partial pilot symbol mapping for the MIMO transmission may be employed, namely the pilot symbols from a sector beam transmission mode may be thinned in accordance with an application scenario such as the delay spread and the moving velocity.

Figure 29:
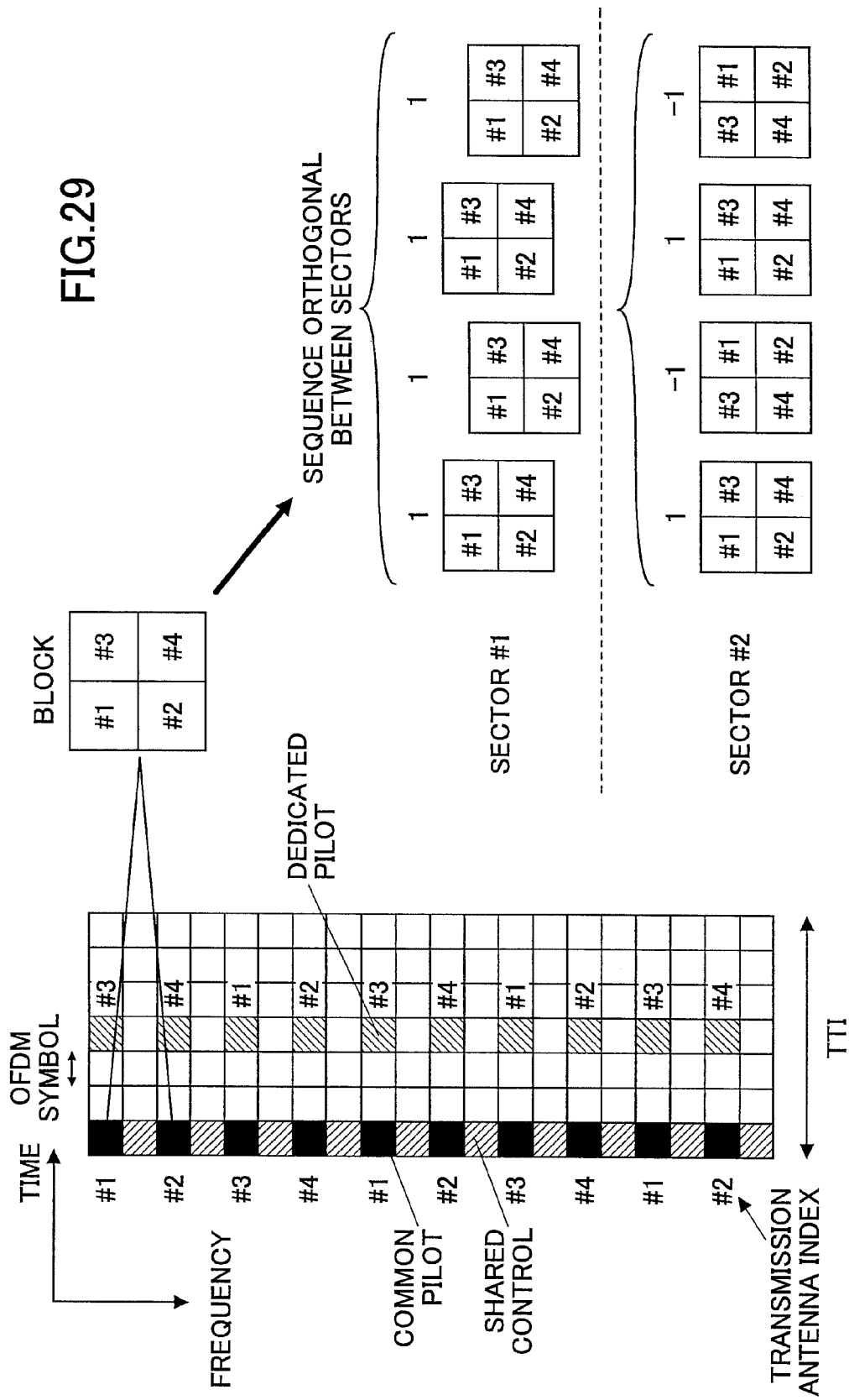
FIG. 29 shows inter-sector orthogonal sequences for MIMO pilot channels.

FIG. 29 shows orthogonal sequences for the MIMO pilot channels between sectors in the case of a four antenna transmitter. The dedicated pilot channels are used to complement the channel estimation. In the drawing, #1, #2, #3, and #4 correspond to a first, a second, a third, and a fourth antenna.

Example 9

In Examples 7 and 8, the inter-cell or inter-sector interference for the pilot channels is suppressed by multiplying the pilot channels by the orthogonal codes. While such orthogonal codes are preferably used from the viewpoint of further suppression of the interference, use of the orthogonal codes is not necessary from the viewpoint of distinguishing cells and/or sectors but non-orthogonal codes may be used. However, when the non-orthogonal code expressed by a general random sequence is used, quality degradation of the pilot channels caused by the inter-code interference described at the beginning of Example 7 may be a concern. On the other hand, there are some types of non-orthogonal codes that are less problematic in terms of the inter-code interference (correlation) compared with the non-orthogonal codes expressed by the random sequence. Such a high-correlativity code (for example, a code that allows the inter-code interference to be on average within one-tenth of the code length) may be used to distinguish the cells and/or the sectors. As an example of such a code, there is a CAZAC code, which is briefly described in the following.

Figure 30:
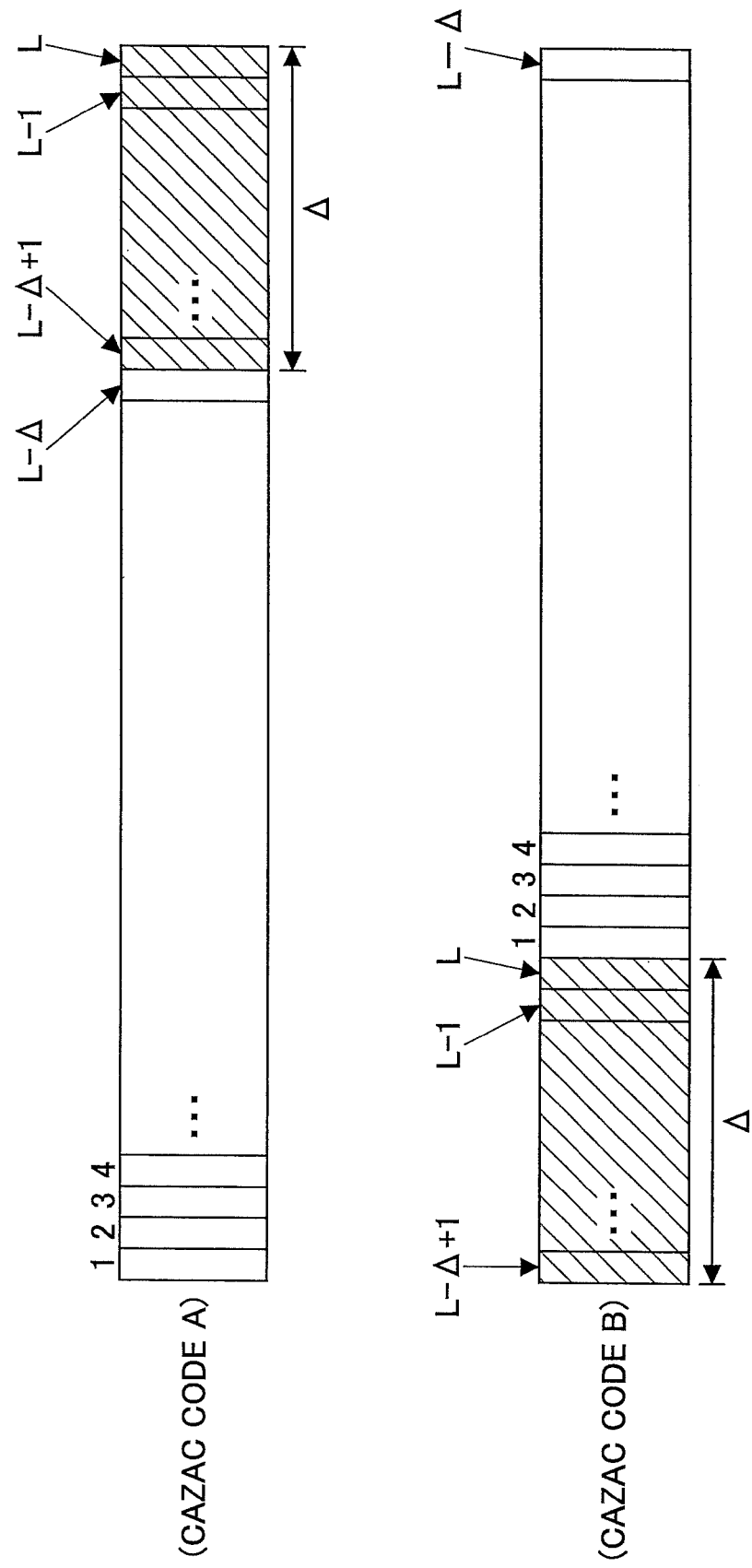
FIG. 30 is an explanatory view of CAZAC codes.

As shown in FIG. 30, it is assumed that a code length of one CAZAC code A is L. For simplicity of explanation, this code length L is assumed to correspond to a time period of L samples, although this assumption is not necessary to the present invention. A series of $\Delta$ samples (shown by hatching in the drawing) including the end sample (L-th sample) of the CAZAC code A are shifted to the top of the CAZAC code A and thus another CAZAC code B is generated, as shown in the bottom of FIG. 30. In this case, the CAZAC codes A, B are orthogonal with each other regarding $\Delta=1$ through L−1. Namely, a first CAZAC code is orthogonal with a second CAZAC code generated by cyclically shifting the first CAZAC code. Therefore, when one CAZAC code having a code length of L is prepared, a group of L codes that are orthogonal with one another can be theoretically prepares. In addition, one CAZAC code A is not orthogonal with another CAZAC code B that is not derived from the CAZAC code A. However, even in this case, the inter-code interference between these CAZAC codes A, B is not significant compared with the inter-code interference between different random sequences. Moreover, the inter-code interference between a code sequence composed of part of one CAZAC code A and a code sequence composed of another part of the CAZAC code A or B is less significant compared with the inter-code interference between different random sequences. For a detailed explanation about the CAZAC code, see "Polyphase codes with good periodic correlation properties", D. C. Chu, IEEE Trans. Inform. Theory, vol. IT-18, pp. 531-532, July 1972; and "On allocation of uplink sub-channels in EUTRA SC-FDMA", 3GPP, R1-050822, Texas Instruments.

Example 10

Figure 31:
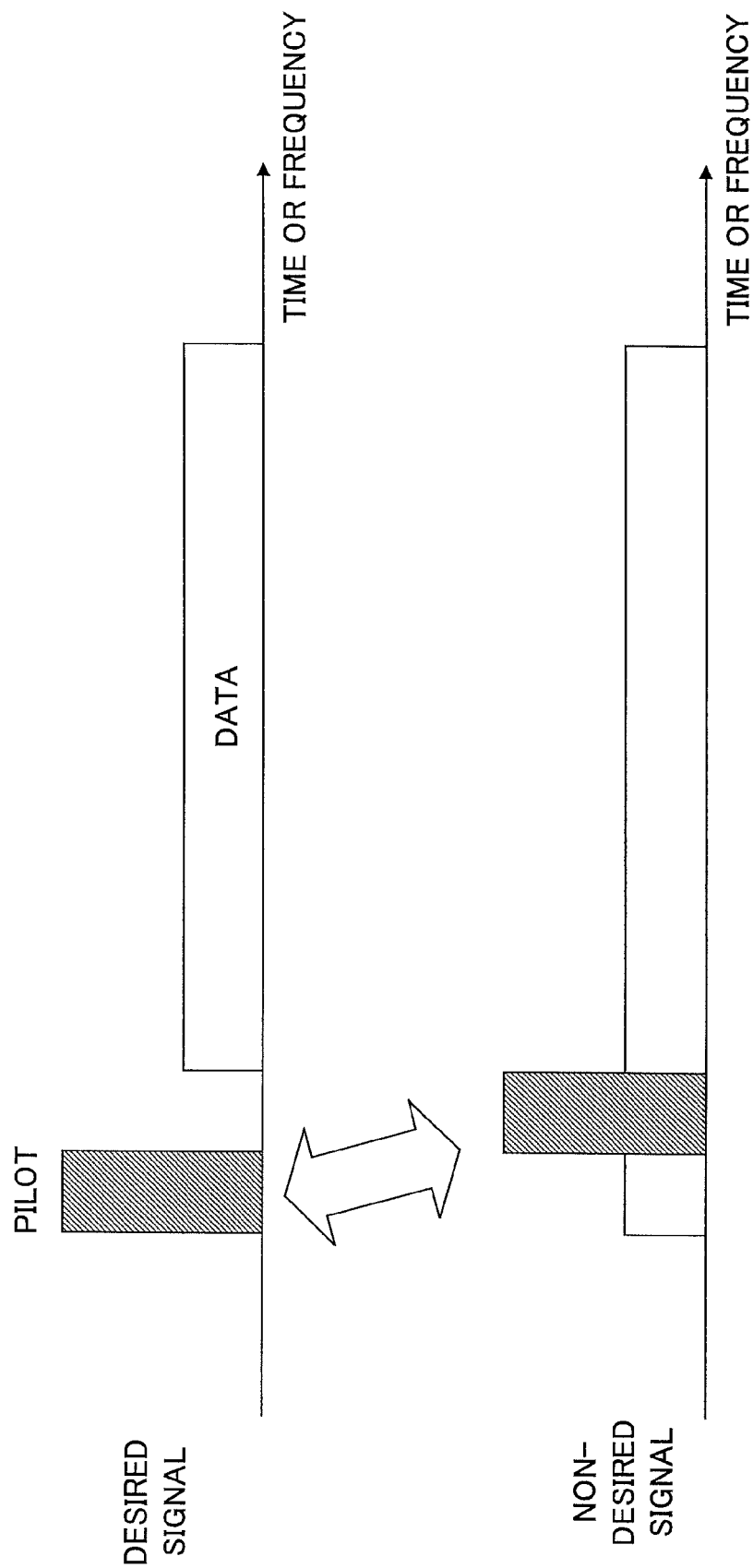
FIG. 31 shows the pilot channel and the data channel of a desired signal and a non-desired signal.

In Examples 7, 8, and 9, the pilot channels of the desired signal and the non-desired signal are concurrently transmitted. In a tenth example, the pilot channels of the desired signal and the non-desired signal are transmitted from a radio base station either at different times or in different frequencies, or both, as shown in FIG. 31. With this, the inter-cell or the inter-sector interference regarding the pilot channels can be suppressed. In addition, when transmitting the data channels of the desired signal is prohibited during which time the pilot channels of the non-desired signal are being transmitted, the interference between the desired signal and the non-desired signal can be further suppressed.

While preferred examples according to the present invention have been described in the foregoing, the present invention is not limited to the described examples but may be modified or altered in various ways within the scope of the present invention. In addition, although the present invention has been described in individual examples for simplicity of explanation, the present invention is not necessarily practiced as each example but one or more of the examples may be combined.

This international patent application is based on Japanese Priority Applications No. 2005-174400, 2005-241905, and 2006-031752, filed on Jun. 14, 2005, Aug. 23, 2005, and Feb. 8, 2006, respectively with the Japanese Patent Office, the entire contents of which are hereby incorporated by reference.

The invention claimed is:

1. A transmission apparatus comprising:
a multiplexing portion that multiplexes a common pilot channel, a shared control channel, and a shared data channel;
a symbol generation portion that performs an inverse Fourier transformation on the multiplexed signal so as to generate a symbol; and
a transmission portion that transmits the generated symbol;
wherein the multiplexing portion multiplexes the shared control channel including control information necessary for demodulation of the shared data channel including a payload and the common pilot channel to be used by plural users in either one of a frequency direction and a time direction, or a combination thereof, and multiplexes the shared data channel in a time direction with respect to the common pilot channel and the shared control channel,
wherein the multiplexing portion multiplexes a dedicated pilot channel used to demodulate the shared data channel with the shared data channel allocated to a specific user in either one of the frequency direction and the time direction, or a combination thereof, and
wherein the dedicated pilot channel is time-multiplexed at a first point of time at predetermined frequency intervals and also time-multiplexed at a second point of time at the predetermined frequency intervals.

2. The transmission apparatus of claim 1, further comprising a portion that adjusts transmission beam directionality to a specific communications party, wherein the dedicated pilot channel is inserted for the specific communications party.

3. The transmission apparatus of claim 1, further comprising plural transmission antennas, wherein the common pilot channel is transmitted from one or more of the plural transmission antennas and the dedicated pilot channel is transmitted from any other one or more of the plural transmission antennas.

4. The transmission apparatus of claim 1, wherein the common pilot channel and the dedicated pilot channel are discontinuously mapped in either one of the time direction and the frequency direction, or a combination thereof.

5. The transmission apparatus of claim 1, wherein the common pilot channel is transmitted with codes that are orthogonal between either one of cells and sectors.

6. The transmission apparatus of claim 1, wherein the common pilot channel is composed of either one of all and part of a CAZAC code having a predetermined code length.

7. The transmission apparatus of claim 5, wherein when the shared data channel is transmitted in a cell or sector, transmission power of the shared data channel is reduced below a predetermined value in different cells or sectors.

8. The transmission apparatus of claim 5, wherein the common pilot channel in a cell or sector is transmitted at either one of a different time and a different frequency, or a combination thereof, from the common pilot channel to be transmitted in a different cell or sector.

9. The transmission apparatus of claim 8, wherein when the common pilot channel is transmitted in a cell or sector, transmission power of the shared data channel is reduced below a predetermined value in a different cell or sector.

10. A transmission method comprising steps of:
multiplexing a shared control channel including control information necessary for demodulation of a shared data channel including a payload and a common pilot channel to be used by plural users in either one of a frequency direction and a time direction, or a combination thereof;
multiplexing the shared data channel in a time direction with respect to the common pilot channel and the shared control channel;
performing an inverse Fourier transform on the multiplexed signal so as to generate a symbol; and
transmitting the generated symbol,
wherein a dedicated pilot channel used to demodulate the shared data channel is multiplexed with the shared data channel allocated to a specific user in either one of the frequency direction and the time direction, or a combination thereof, and
wherein the dedicated pilot channel is time-multiplexed at a first point of time at predetermined frequency intervals and also time-multiplexed at a second point of time at the predetermined frequency intervals.

11. A reception apparatus comprising:
a reception portion that receives a symbol transmitted from a transmitter;
a transformation portion that performs a Fourier transformation on the received symbol; and
a separation portion that separates a common pilot channel, a shared control channel, and a shared data channel from the transformed signal;
wherein the separation portion separates the common pilot channel to be used by plural users and the shared control channel including control information necessary for demodulation of the shared data channel in either one of a frequency direction and a time direction, or a combination thereof, and separates the shared data channel including a payload in the time direction with respect to the common pilot channel and the shared control channel,
wherein a dedicated pilot channel used to demodulate the shared data channel is multiplexed with the shared data channel allocated to a specific user in either one of the frequency direction and the time direction, or a combination thereof, and
wherein the dedicated pilot channel is time-multiplexed at a first point of time at predetermined frequency intervals and also time-multiplexed at a second point of time at the predetermined frequency intervals.

12. A reception method comprising steps of:
receiving a symbol transmitted from a transmitter;
performing a Fourier transformation on the received symbol;
separating a common pilot channel to be used by plural users and a shared control channel including control information necessary for demodulation of a shared data channel including a payload in either one of a frequency direction and a time direction, or combination thereof, and
separating the shared data channel in the time direction with respect to the common pilot channel and the shared control channel,
wherein a dedicated pilot channel used to demodulate the shared data channel is multiplexed with the shared data channel allocated to a specific user in either one of the frequency direction and the time direction, or a combination thereof, and
wherein the dedicated pilot channel is time-multiplexed at a first point of time at predetermined frequency intervals and also time-multiplexed at a second point of time at the predetermined frequency intervals.

* * * * *